US012696101B2

(12) United States Patent
Chance et al.

(10) Patent No.: US 12,696,101 B2
(45) Date of Patent: Jul. 28, 2026

(54) CONFIGURABLE HYBRID BEAMFORMING

(71) Applicant: Intel Corporation, Santa Clara, CA (US)

(72) Inventors: Gregory Chance, Chandler, AZ (US); Ashoke Ravi, Portland, OR (US); Benjamin Jann, Portland, OR (US); Paolo Madoglio, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 85 days.

(21) Appl. No.: 17/560,117

(22) Filed: Dec. 22, 2021

(65) Prior Publication Data

US 2023/0199516 A1 Jun. 22, 2023

(51) Int. Cl.

| | |
|---|---|
| ***H04W 16/28*** | (2009.01) |
| ***H04B 7/06*** | (2006.01) |
| ***H04B 17/318*** | (2015.01) |
| ***H04W 24/10*** | (2009.01) |
| ***H04W 36/00*** | (2009.01) |

(52) U.S. Cl.

CPC .......... *H04W 16/28* (2013.01); *H04B 7/0617* (2013.01); *H04B 17/318* (2015.01); *H04W 24/10* (2013.01); *H04W 36/00837* (2018.08)

(58) Field of Classification Search

None

See application file for complete search history.

(56) References Cited

U.S. PATENT DOCUMENTS

| | | | | |
|---|---|---|---|---|
| 9,806,777 | B1 * | 10/2017 | Doostnejad | H04B 7/0617 |
| 10,256,893 | B2 * | 4/2019 | Bergström | H04B 7/0695 |
| 2016/0080051 | A1 * | 3/2016 | Sajadieh | H04B 7/0452 375/267 |
| 2016/0352407 | A1 * | 12/2016 | Ling | H04B 7/0617 |
| 2019/0181926 | A1 * | 6/2019 | Liang | H01Q 25/008 |
| 2020/0358501 | A1 * | 11/2020 | Hormis | H04B 7/0695 |
| 2021/0084697 | A1 * | 3/2021 | Damnjanovic | H04L 5/0053 |
| 2021/0243075 | A1 * | 8/2021 | Ryu | H04L 41/0677 |
| 2022/0029688 | A1 * | 1/2022 | Pezeshki | H04B 7/0695 |
| 2022/0086665 | A1 * | 3/2022 | Pezeshki | H04W 24/04 |
| 2022/0247445 | A1 * | 8/2022 | Sienko | H04B 1/40 |

* cited by examiner

*Primary Examiner* — German Viana Di Prisco

(74) *Attorney, Agent, or Firm* — Schwegman Lundberg & Woessner, P.A.

(57) ABSTRACT

A wireless communication device can include an antenna array and processing circuitry coupled to the antenna array to segment antenna elements of an antenna array into a configurable plurality of groups of antenna elements. The processing circuitry can also activate analog beamforming for at least one group of the plurality of groups of antenna elements. Subsequent to enabling analog beamforming, the processing circuitry can configure digital beamforming for the at least one group based on a criterion.

21 Claims, 17 Drawing Sheets

CONFIGURABLE HYBRID BEAMFORMING

TECHNICAL FIELD

Aspects of the disclosure pertain to radio frequency (RF) communications. More particularly, aspects relate to beamforming for RF communications.

BACKGROUND

Different customers and applications require digital beamforming for some chains and analog beamforming for others. Therefore, there is a general need to dynamically configure different chains for digital or analog beamforming.

BRIEF DESCRIPTION OF THE DRAWINGS

In the drawings, which are not necessarily drawn to scale, like numerals may describe similar components in different views. Like numerals having different letter suffixes may represent different instances of similar components. Some aspects are illustrated by way of example, and not limitation, in the figures of the accompanying drawings in which.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Different applications require digital beamforming for some chains and analog beamforming for others. As an example, it may be desirable to implement digital beamforming horizontally (by column) and analog beamforming vertically (by rows). In addition, there are use cases in which digital beamforming may be desired to achieve performance, with the possible tradeoff in power consumption, while in other applications analog beamforming with lower power consumption may be sufficient for performance needs. However, available hardware implementations may provide fixed configurations of either analog or digital beamforming, without providing flexibility for different applications and use cases.

Aspects described herein address these concerns by providing a configurable solution for analog or digital beamforming that enables dynamic selection of which chains are combined in the analog domain (analog beamforming) versus in digital domain (digital beamforming). The communication systems, devices, and other components in which configurable beamforming in accordance with some aspects are implemented, are described in more detail with respect to FIG. 1-9.

Figure 1:
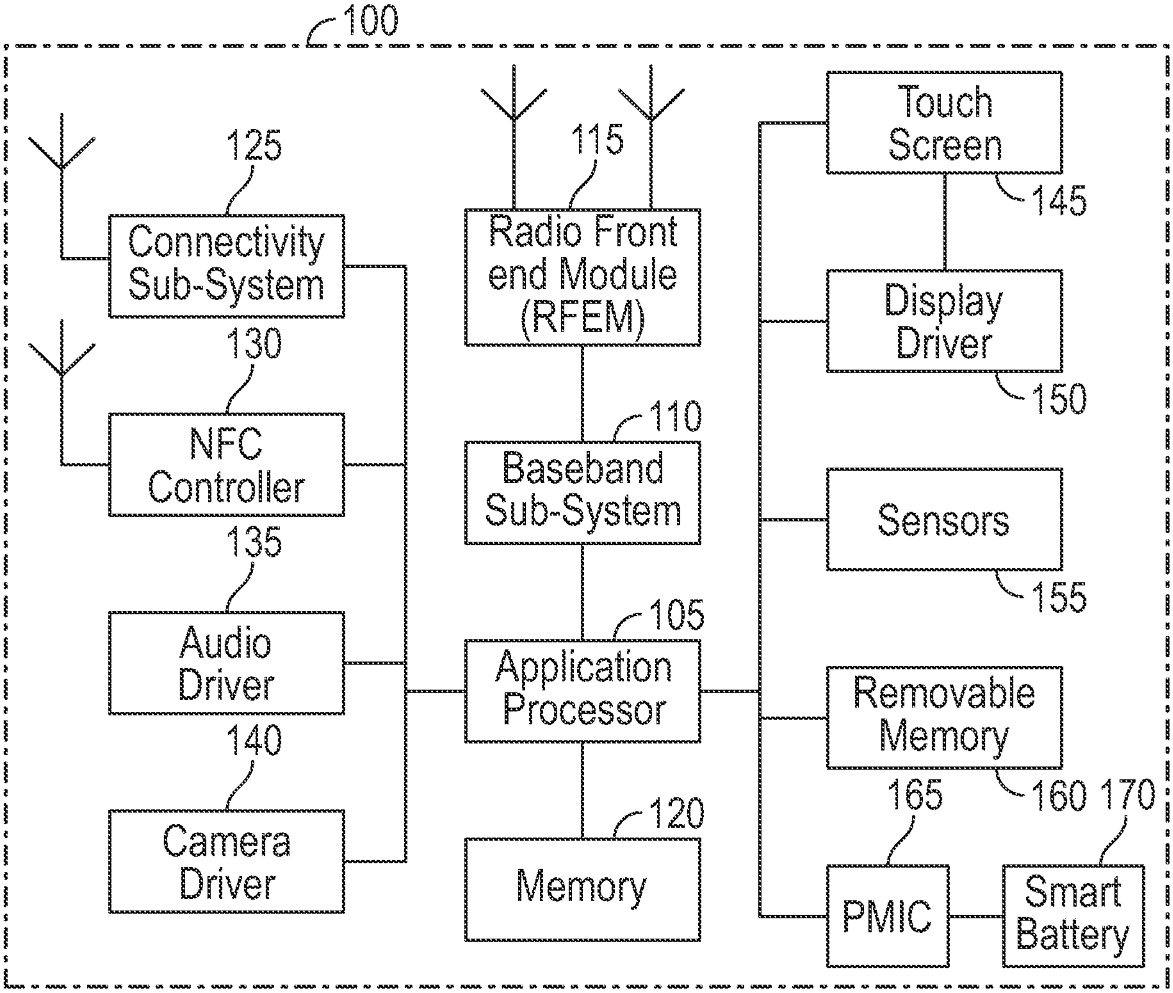
FIG. 1 illustrates an exemplary user device according to some aspects.

An integrated Radio-Frequency frontend module (FEM) is broadly used in the frontend circuits for cellular handsets or other wireless devices. FIG. 1 illustrates an exemplary user device according to some aspects. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165, and smart battery 170.

In some aspects, application processor 105 may include, for example, one or more central processing unit (CPU) cores and one or more of cache memory, low drop-out voltage regulators (LDOs), interrupt controllers, serial interfaces such as serial peripheral interface (SPI), inter-integrated circuit (I2C) or universal programmable serial interface sub-system, real time clock (RTC), timer-counters including interval and watchdog timers, general purpose IO, memory card controllers such as SD/MMC or similar, USB interfaces, mobile industry processor interface (MIPI) interfaces, and/or Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module including two or more integrated circuits.

Applications of mmWave technology can include, for example, WiGig and 5G, but the mmWave technology can be applicable to a variety of telecommunications systems. The mmWave technology can be especially attractive for short-range telecommunications systems. WiGig devices operate in the unlicensed 60 GHz band, whereas 5G mmWave will operate in the licensed 28 GHz and 39 GHz bands. A block diagram of an example baseband processor 110 and RFEM 115 in a mmWave system is shown in FIG. 1A.

Figure 1A:
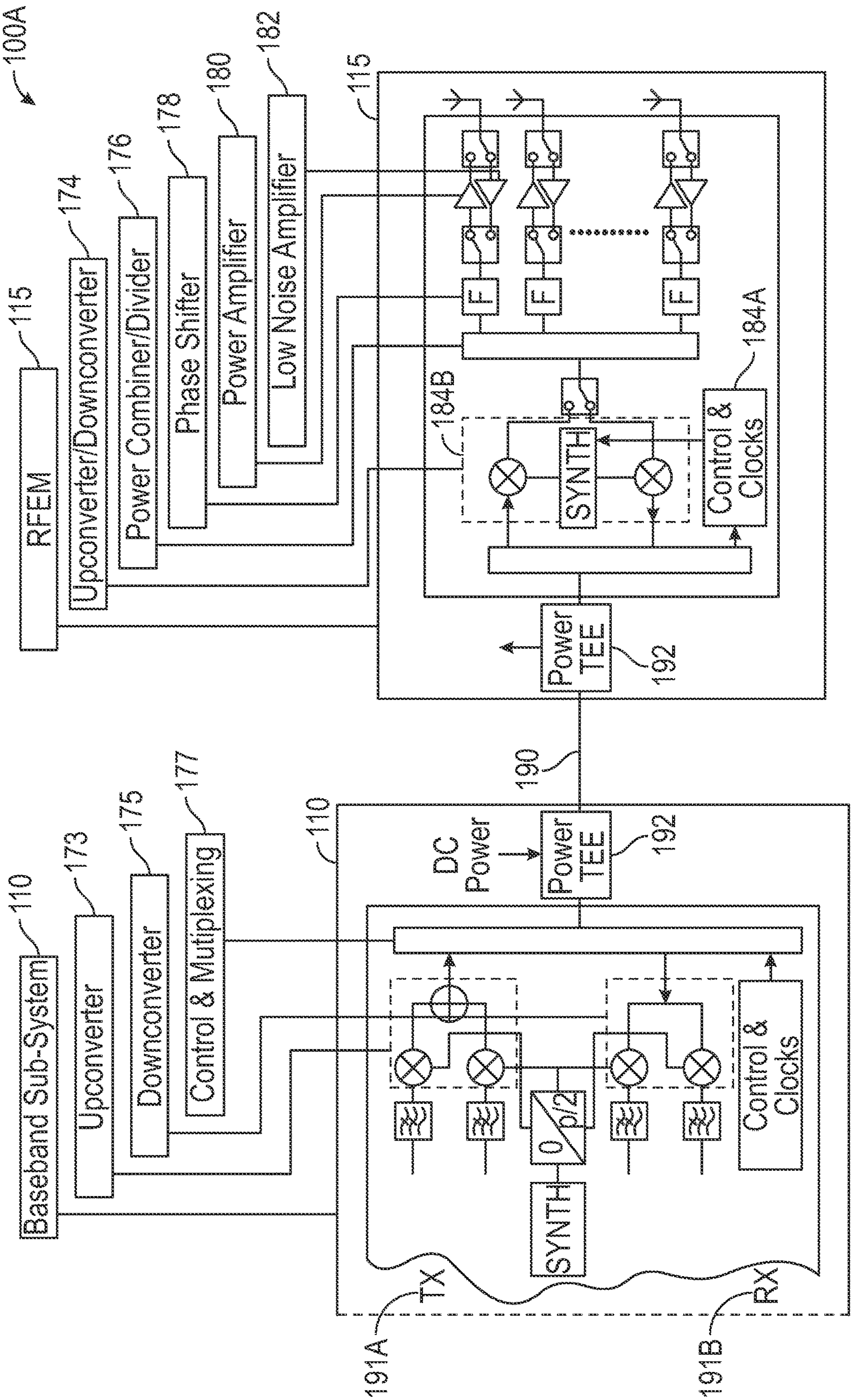
FIG. 1A illustrates a mmWave system, which can be used in connection with the device of FIG. 1 according to some aspects.

FIG. 1A illustrates a mmWave system 100A, which can be used in connection with the device 100 of FIG. 1 according to some aspects of the present disclosure. The system 100A includes two components: a baseband processor 110 and one or more radio front end modules (RFEMs) 115. The RFEM 115 can be connected to the baseband processor 110 by a cable 190, which supplies a modulated intermediate frequency (IF) signal, DC power, clocking signals and control signals.

The baseband processor 110 is not shown in its entirety, but FIG. 1A rather shows an implementation of analog front end. This includes a transmitter (TX) section 191A with an upconverter 173 to intermediate frequency (IF), a receiver (RX) section 191B with downconversion 175 from IF to baseband, control and multiplexing circuitry 177 including a combiner to multiplex/demultiplex transmit and receive signals onto a single cable 190. In addition, in a representative implementation, power tee circuitry 192 (which includes discrete components) can be included on the baseband circuit board to provide DC power for the RFEM 115. In some aspects, the combination of the TX section and RX section may be referred to as a transceiver, to which may be coupled one or more antennas or antenna arrays of the types described herein. While one combiner is shown, it will be appreciated that multiple combiners may be implemented.

The RFEM 115 can be a small circuit board including a number of printed antennas and one or more RF devices containing multiple radio chains, including upconversion/downconversion 174 to millimeter wave frequencies, power combiner/divider 176, programmable phase shifting 178 and power amplifiers (PA) 180, low noise amplifiers (LNA) 182, as well as control and power management circuitry 184A and 184B. This arrangement can be different from Wi-Fi or cellular implementations, which generally have all RF and baseband functionality integrated into a single unit and only antennas connected remotely via coaxial cables.

This architectural difference can be driven by the very large power losses in coaxial cables at millimeter wave frequencies. These power losses can reduce the transmit power at the antenna and reduce receive sensitivity. In order to avoid this issue, in some aspects, PAs 180 and LNAs 182 may be moved to the RFEM 115 with integrated antennas. In addition, the RFEM 115 may include upconversion/downconversion 174 so that the IF signals over the coaxial cable 190 can be at a lower frequency. Additional system context for mmWave 5G apparatuses, techniques and features is discussed herein below.

Figure 2:
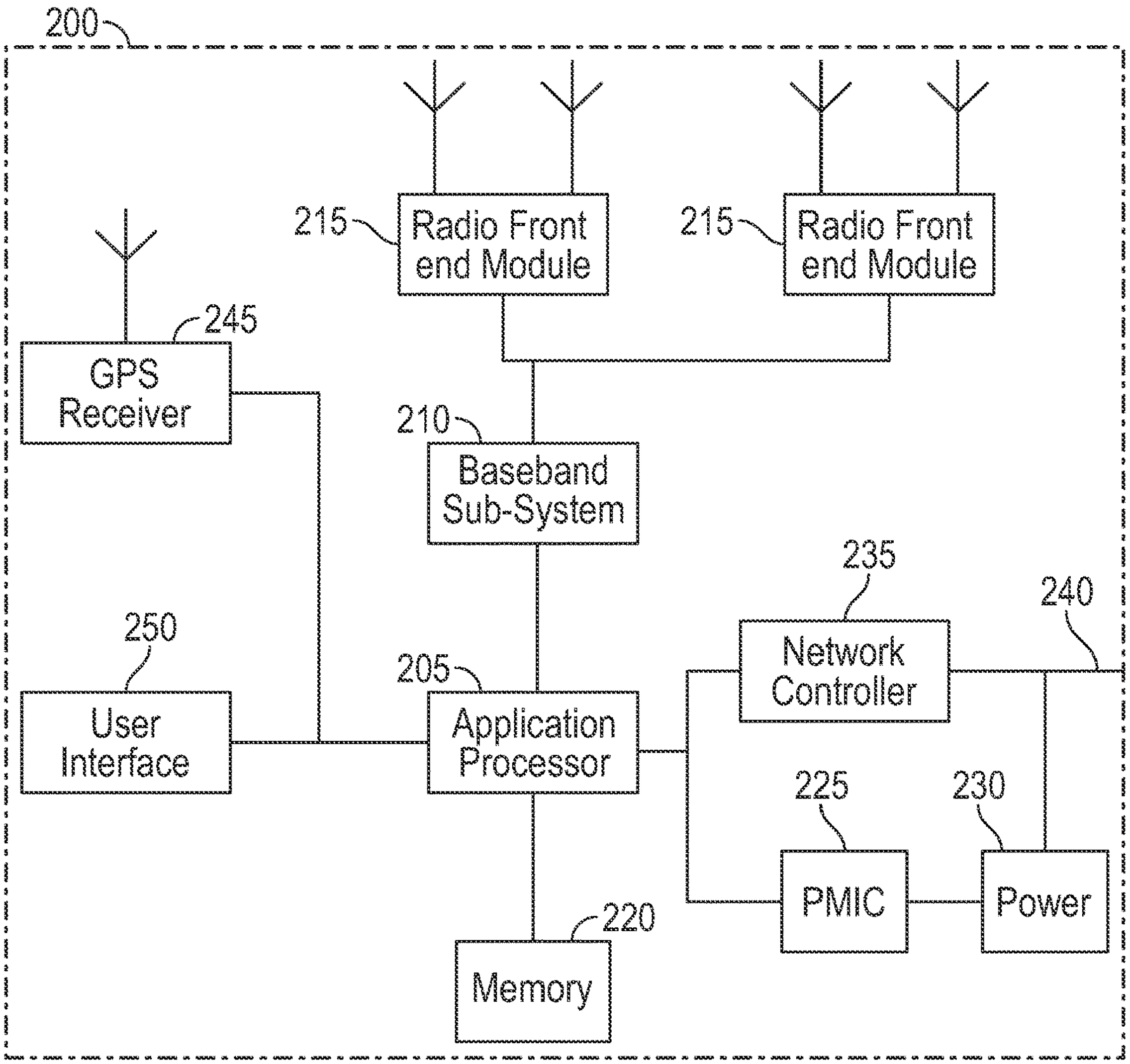
FIG. 2 illustrates an exemplary base station radio head according to some aspects.

FIG. 2 illustrates an exemplary base station or infrastructure equipment radio head according to some aspects. The base station radio head 200 may include one or more of application processor 205, baseband processors 210, one or more radio front end modules 215, memory 220, power management integrated circuitry (PMIC) 225, power tee circuitry 230, network controller 235, network interface connector 240, satellite navigation receiver (e.g., GPS receiver) 245, and user interface 250.

In some aspects, application processor 205 may include one or more CPU cores and one or more of cache memory, low drop-out voltage regulators (LDOs), interrupt controllers, serial interfaces such as SPI, I2C or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip sub-system including two or more integrated circuits.

In some aspects, memory 220 may include one or more of volatile memory including dynamic random access memory (DRAM) and/or synchronous DRAM (SDRAM), and non-volatile memory (NVM) including high-speed electrically erasable memory (commonly referred to as Flash memory), phase-change random access memory (PRAM), magnetoresistive random access memory (MRAM), and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable. Power tee circuitry 230 may provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide, to application processor 205, data which may include one or more of position data or time data. Time data may be used by application processor 205 to synchronize operations with other radio base stations or infrastructure equipment.

In some aspects, user interface 250 may include one or more of buttons. The buttons may include a reset button. User interface 250 may also include one or more indicators such as LEDs and a display screen.

Figure 3A:
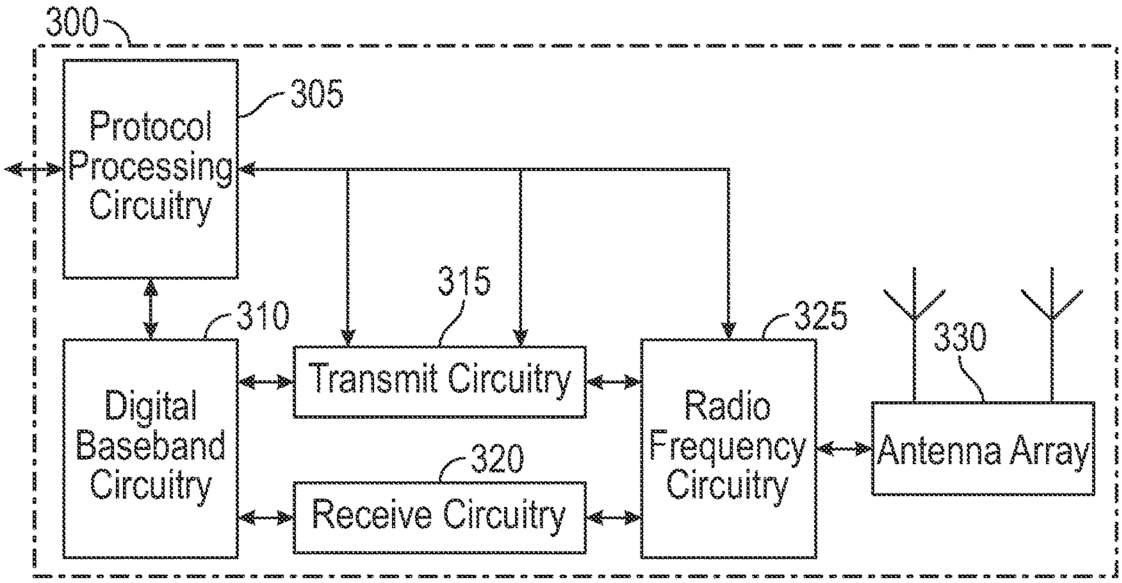
FIG. 3A illustrates exemplary wireless communication circuitry according to some aspects.
Figure 3B:
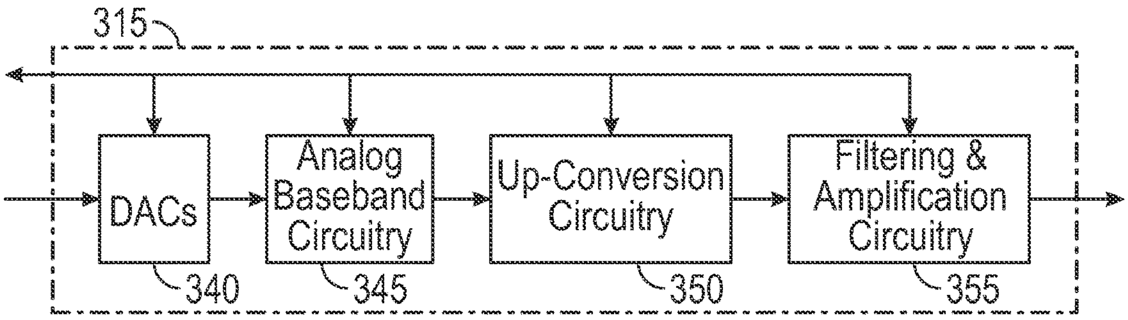
FIG. 3B illustrates aspects of exemplary transmit circuitry illustrated in FIG. 3A according to some aspects.
Figure 3C:
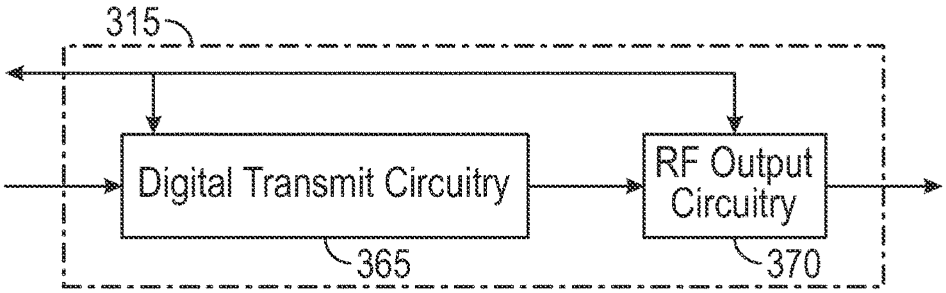
FIG. 3C illustrates aspects of exemplary transmit circuitry illustrated in FIG. 3A according to some aspects.
Figure 3D:
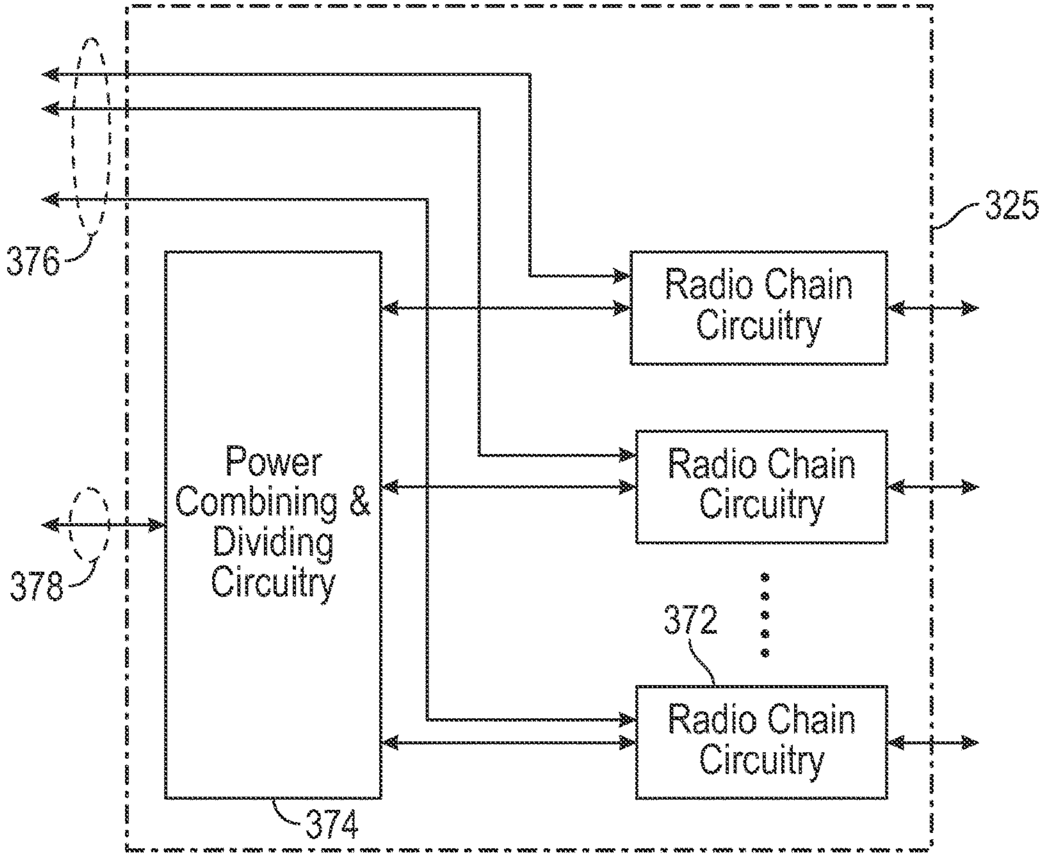
FIG. 3D illustrates aspects of exemplary radio frequency circuitry illustrated in FIG. 3A according to some aspects.
Figure 3E:
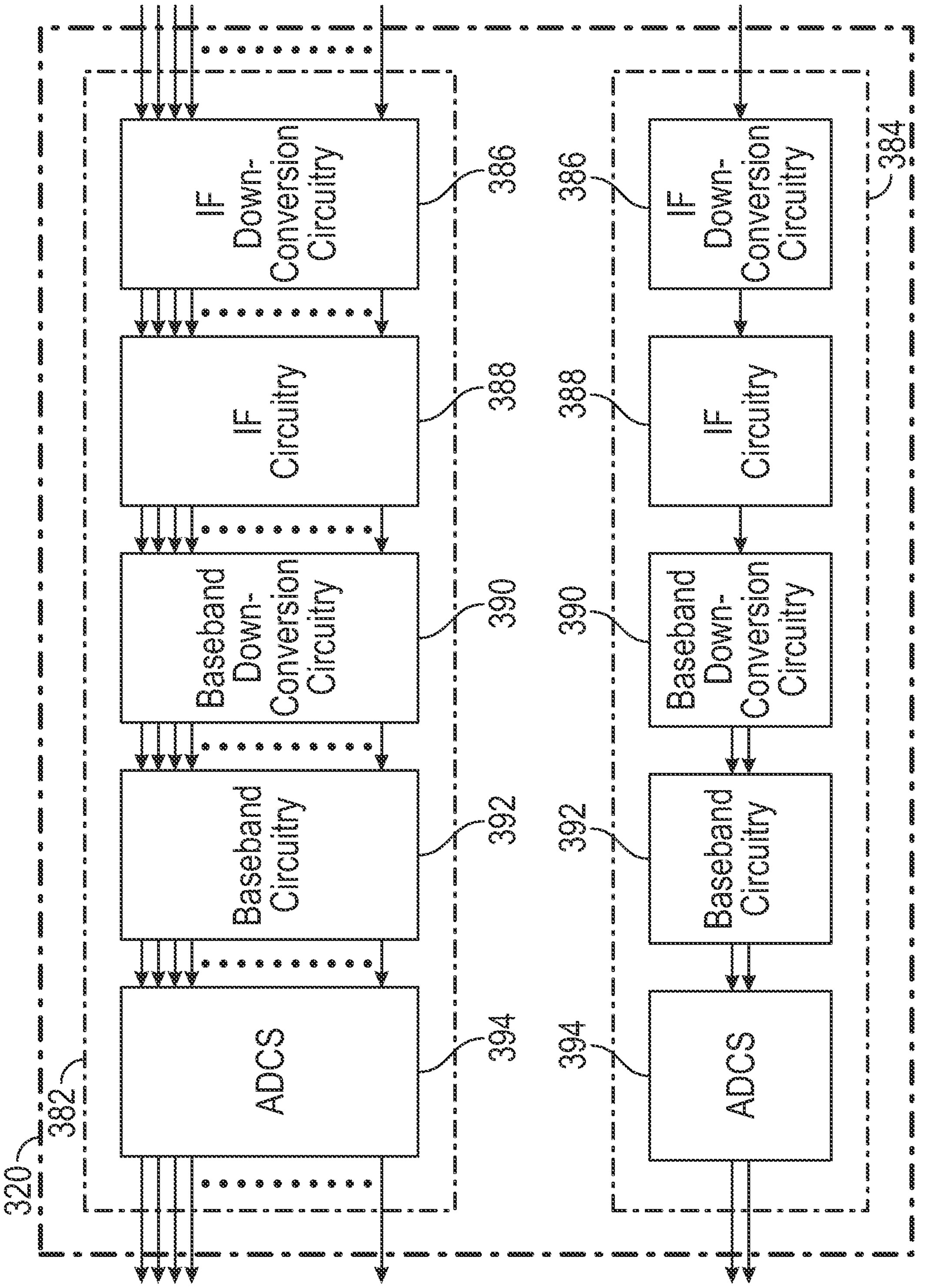
FIG. 3E illustrates aspects of exemplary receive circuitry in FIG. 3A according to some aspects.

FIG. 3A illustrates exemplary wireless communication circuitry according to some aspects; FIGS. 3B and 3C illustrate aspects of transmit circuitry shown in FIG. 3A according to some aspects; FIG. 3D illustrates aspects of radio frequency circuitry shown in FIG. 3A according to some aspects; FIG. 3E illustrates aspects of receive circuitry in FIG. 3A according to some aspects. Wireless communication circuitry 300 shown in FIG. 3A may be alternatively grouped according to functions. Components illustrated in FIG. 3A are provided here for illustrative purposes and may include other components not shown in FIG. 3A.

Wireless communication circuitry 300 may include protocol processing circuitry 305 (or processor) or other means for processing. Protocol processing circuitry 305 may implement one or more of medium access control (MAC), radio link control (RLC), packet data convergence protocol (PDCP), radio resource control (RRC) and non-access stratum (NAS) functions, among others. Protocol processing circuitry 305 may include one or more processing cores to execute instructions and one or more memory structures to store program and data information.

Wireless communication circuitry 300 may further include digital baseband circuitry 310. Digital baseband circuitry 310 may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Wireless communication circuitry 300 may further include transmit circuitry 315, receive circuitry 320 and/or antenna array circuitry 330. Wireless communication circuitry 300 may further include RF circuitry 325. In some aspects, RF circuitry 325 may include one or multiple parallel RF chains for transmission and/or reception. Each of the RF chains may be connected to one or more antennas of antenna array circuitry 330.

In some aspects, protocol processing circuitry 305 may include one or more instances of control circuitry. The control circuitry may provide control functions for one or more of digital baseband circuitry 310, transmit circuitry 315, receive circuitry 320, and/or RF circuitry 325.

FIGS. 3B and 3C illustrate aspects of transmit circuitry shown in FIG. 3A according to some aspects. Transmit circuitry 315 shown in FIG. 3B may include one or more of digital to analog converters (DACs) 340, analog baseband circuitry 345, up-conversion circuitry 350 and/or filtering and amplification circuitry 355. DACs 340 may convert digital signals into analog signals. Analog baseband circuitry 345 may perform multiple functions as indicated below. Up-conversion circuitry 350 may up-convert baseband signals from analog baseband circuitry 345 to RF frequencies (e.g., mmWave frequencies). Filtering and amplification circuitry 355 may filter and amplify analog signals. Control signals may be supplied between protocol processing circuitry 305 and one or more of DACs 340, analog baseband circuitry 345, up-conversion circuitry 350 and/or filtering and amplification circuitry 355.

Transmit circuitry 315 shown in FIG. 3C may include digital transmit circuitry 365 and RF circuitry 370. In some aspects, signals from filtering and amplification circuitry 355 may be provided to digital transmit circuitry 365. As above, control signals may be supplied between protocol processing circuitry 305 and one or more of digital transmit circuitry 365 and RF circuitry 370.

FIG. 3D illustrates aspects of radio frequency circuitry shown in FIG. 3A according to some aspects. Radio frequency circuitry 325 may include one or more instances of radio chain circuitry 372, which in some aspects may include one or more filters, power amplifiers, low noise amplifiers, programmable phase shifters and power supplies.

Radio frequency circuitry 325 may also in some aspects include power combining and dividing circuitry 374. In some aspects, power combining and dividing circuitry 374 may operate bidirectionally, such that the same physical circuitry may be configured to operate as a power divider when the device is transmitting, and as a power combiner when the device is receiving. In some aspects, power combining and dividing circuitry 374 may include one or more wholly or partially separate circuitries to perform power dividing when the device is transmitting and power combining when the device is receiving. In some aspects, power combining and dividing circuitry 374 may include passive circuitry including one or more two-way power divider/combiners arranged in a tree. In some aspects, power combining and dividing circuitry 374 may include active circuitry including amplifier circuits.

In some aspects, radio frequency circuitry 325 may connect to transmit circuitry 315 and receive circuitry 320 in FIG. 3A. Radio frequency circuitry 325 may connect to transmit circuitry 315 and receive circuitry 320 via one or more radio chain interfaces 376 and/or a combined radio chain interface 378. In some aspects, one or more radio chain interfaces 376 may provide one or more interfaces to one or more receive or transmit signals, each associated with a single antenna structure. In some aspects, the combined radio chain interface 378 may provide a single interface to one or more receive or transmit signals, each associated with a group of antenna structures.

FIG. 3E illustrates aspects of receive circuitry in FIG. 3A according to some aspects. Receive circuitry 320 may include one or more of parallel receive circuitry 382 and/or one or more of combined receive circuitry 384. In some aspects, the one or more parallel receive circuitry 382 and one or more combined receive circuitry 384 may include one or more Intermediate Frequency (IF) down-conversion circuitry 386, IF processing circuitry 388, baseband down-conversion circuitry 390, baseband processing circuitry 392 and analog-to-digital converter (ADC) circuitry 394. As used herein, the term “intermediate frequency” refers to a frequency to which a carrier frequency (or a frequency signal) is shifted as in intermediate step in transmission, reception, and/or signal processing. IF down-conversion circuitry 386 may convert received RF signals to IF. IF processing circuitry 388 may process the IF signals, e.g., via filtering and amplification. Baseband down-conversion circuitry 390 may convert the signals from IF processing circuitry 388 to baseband. Baseband processing circuitry 392 may process the baseband signals, e.g., via filtering and amplification. ADC circuitry 394 may convert the processed analog baseband signals to digital signals.

Figure 4:
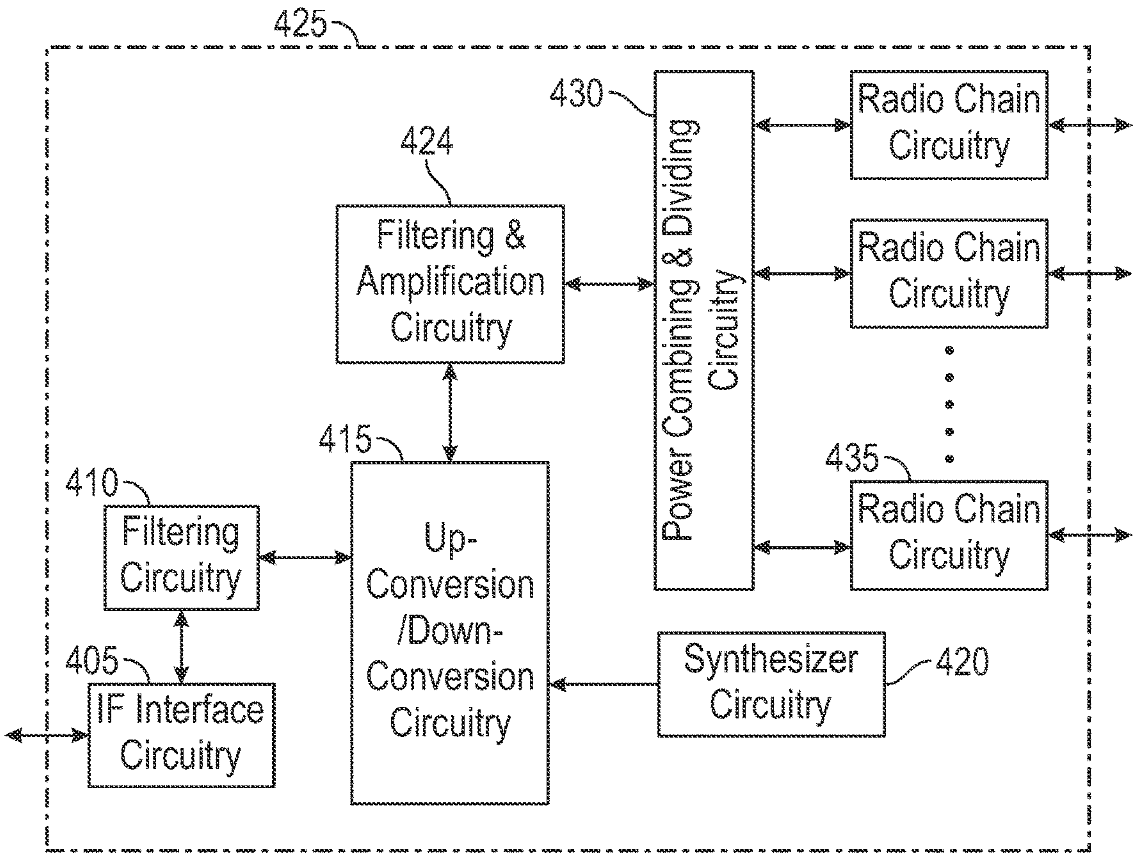
FIG. 4 illustrates exemplary useable RF circuitry in FIG. 3A according to some aspects.

FIG. 4 illustrates exemplary RF circuitry of FIG. 3A according to some aspects. In an aspect, RF circuitry 325 in FIG. 3A (depicted in FIG. 4 using reference number 425) may include one or more of the IF interface circuitry 405, filtering circuitry 410, up-conversion and down-conversion circuitry 415, synthesizer circuitry 420, filtering and amplification circuitry 424, power combining and dividing circuitry 430, and radio chain circuitry 435.

Figure 5A:
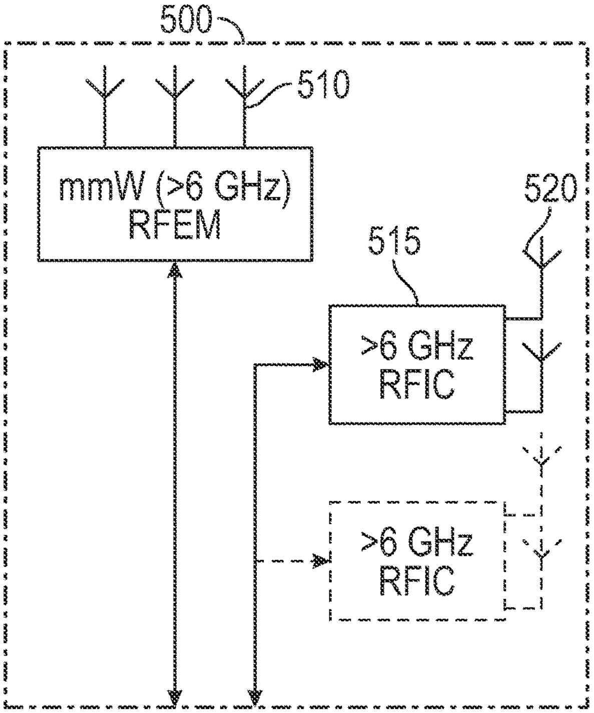
FIG. 5A illustrates an aspect of an exemplary radio front end module (RFEM) according to some aspects.
Figure 5B:
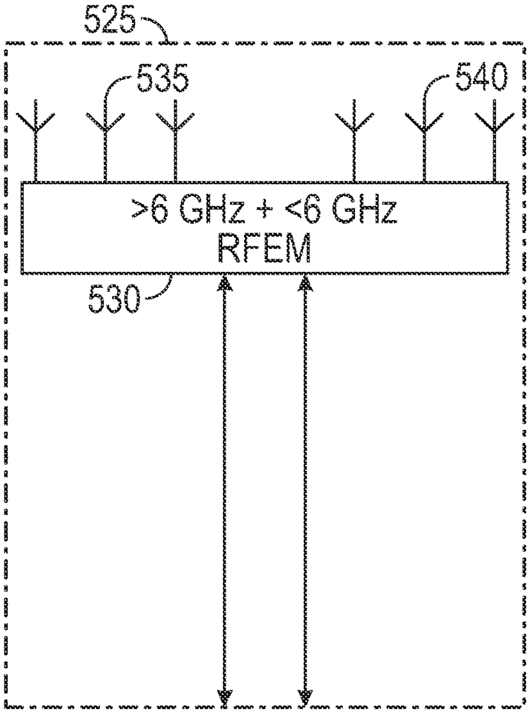
FIG. 5B illustrates an alternate aspect of an exemplary radio front end module, according to some aspects.

FIG. 5A and FIG. 5B illustrate aspects of a radio front-end module (RFEM) useable in the circuitry shown in FIG. 1 and FIG. 2, according to some aspects. FIG. 5A illustrates an aspect of a RFEM according to some aspects. RFEM 500 incorporates a millimeter wave RFEM 505 and one or more above-six gigahertz radio frequency integrated circuits (RFIC) 515 and/or one or more sub-six gigahertz RFICs 522. In this aspect, the one or more sub-six gigahertz RFICs 515 and/or one or more sub-six gigahertz RFICs 522 may be physically separated from millimeter wave RFEM 505. RFICs 515 and 522 may include connection to one or more antennas 520. RFEM 505 may include multiple antennas 510.

FIG. 5B illustrates an alternate aspect of a radio front end module, according to some aspects. In this aspect both millimeter wave and sub-six gigahertz radio functions may be implemented in the same physical radio front end module (RFEM) 530. RFEM 530 may incorporate both millimeter wave antennas 535 and sub-six gigahertz antennas 540.

Figure 6:
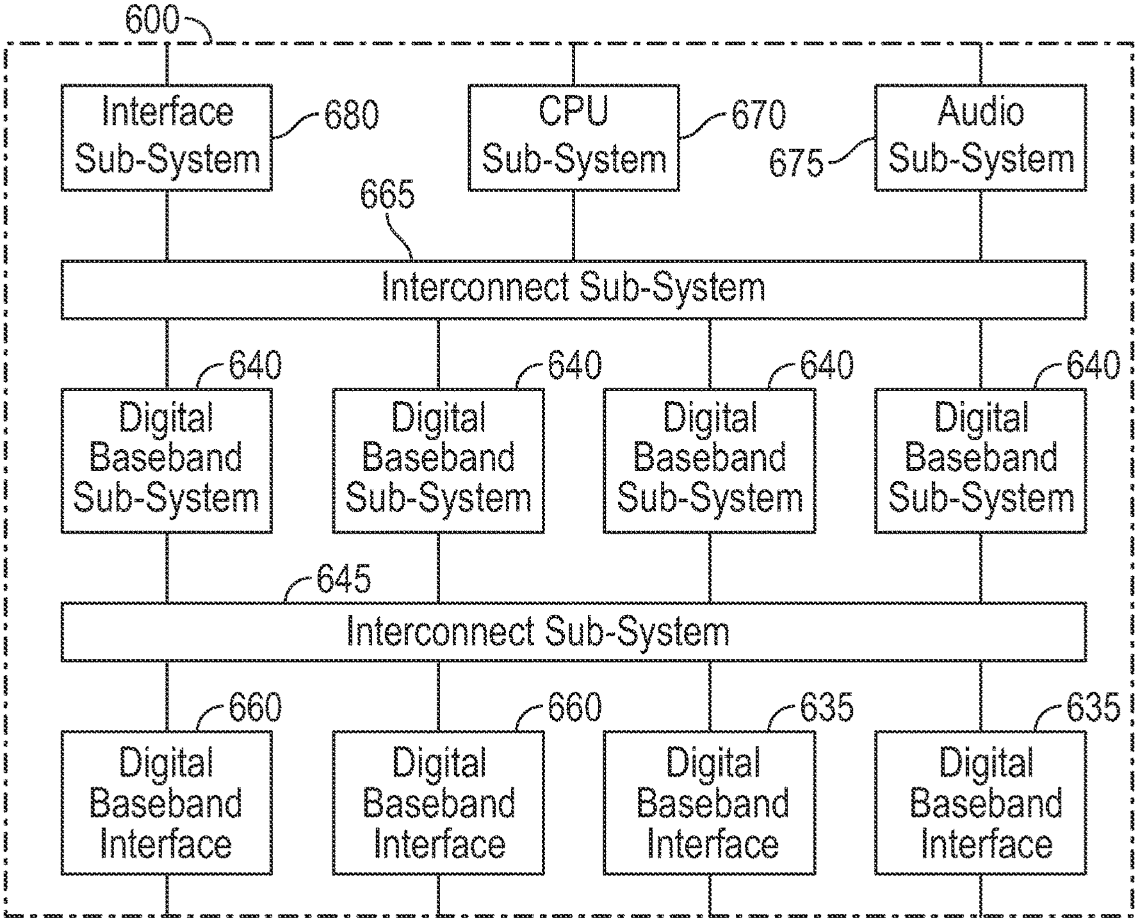
FIG. 6 illustrates an exemplary multi-protocol baseband processor useable in FIG. 1 or FIG. 2, according to some aspects.

FIG. 6 illustrates a multi-protocol baseband processor 600 useable in the system and circuitry shown in FIG. 1 or FIG. 2, according to some aspects. In an aspect, baseband processor may contain one or more digital baseband subsystems 640A, 640B, 640C, 640D, also herein referred to collectively as digital baseband subsystems 640.

In an aspect, the one or more digital baseband subsystems 640A, 640B, 640C, 640D may be coupled via interconnect subsystem 665 to one or more of CPU subsystem 670, audio subsystem 675 and interface subsystem 680. In an aspect, the one or more digital baseband subsystems 640 may be coupled via interconnect subsystem 645 to one or more of each of digital baseband interface 660A, 660B and mixed-signal baseband subsystem 635A, 635B.

In an aspect, interconnect subsystem 665 and 645 may each include one or more of each of buses point-to-point connections and network-on-chip (NOC) structures. In an aspect, audio subsystem 675 may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters.

Figure 7:
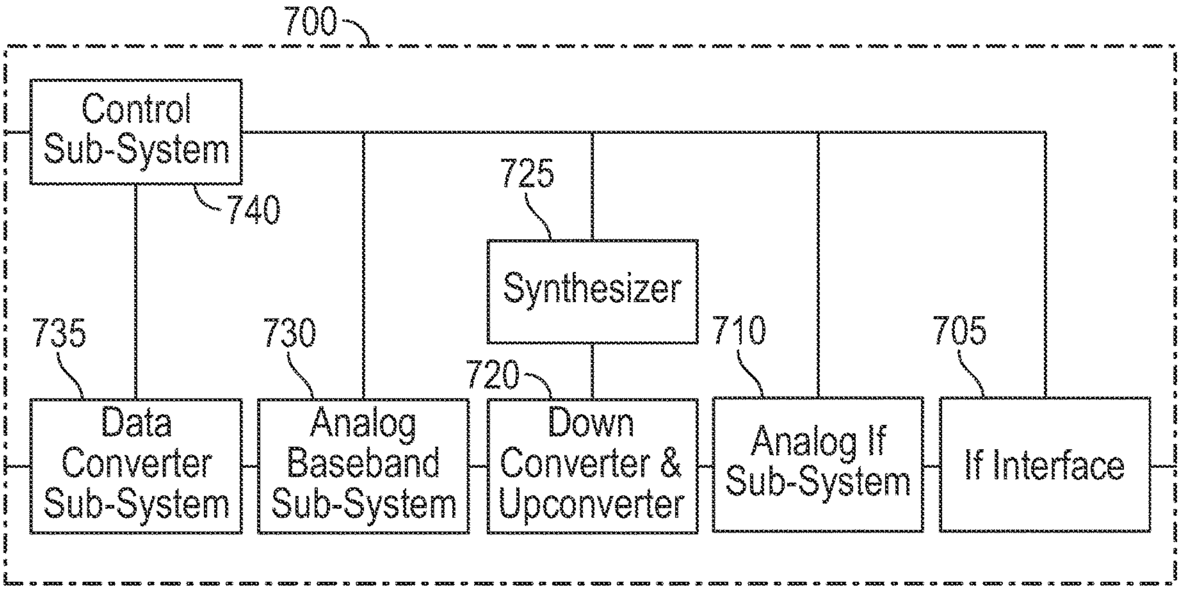
FIG. 7 illustrates an exemplary mixed signal baseband subsystem, according to some aspects.

FIG. 7 illustrates an exemplary of a mixed signal baseband subsystem 700, according to some aspects. In an aspect, mixed signal baseband subsystem 700 may include one or more of IF interface 705, analog IF subsystem 710, down-converter and up-converter subsystem 720, analog baseband subsystem 730, data converter subsystem 735, synthesizer 725 and control subsystem 740.

Figure 8A:
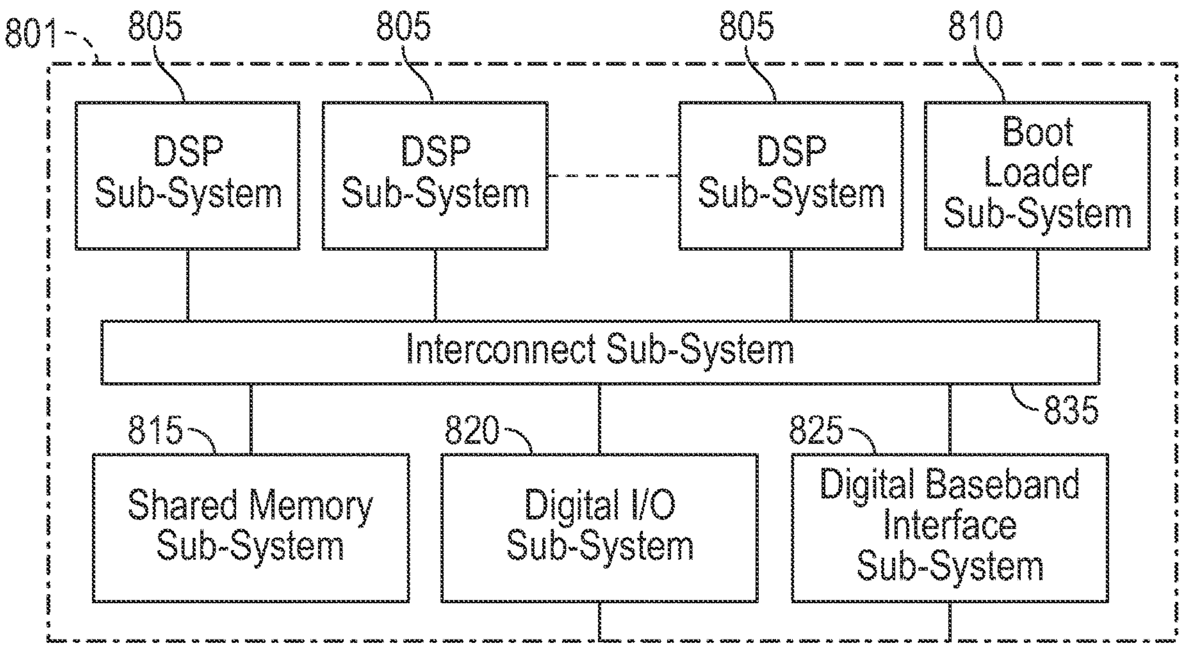
FIG. 8A illustrates an exemplary digital baseband subsystem, according to some aspects.
Figure 8B:
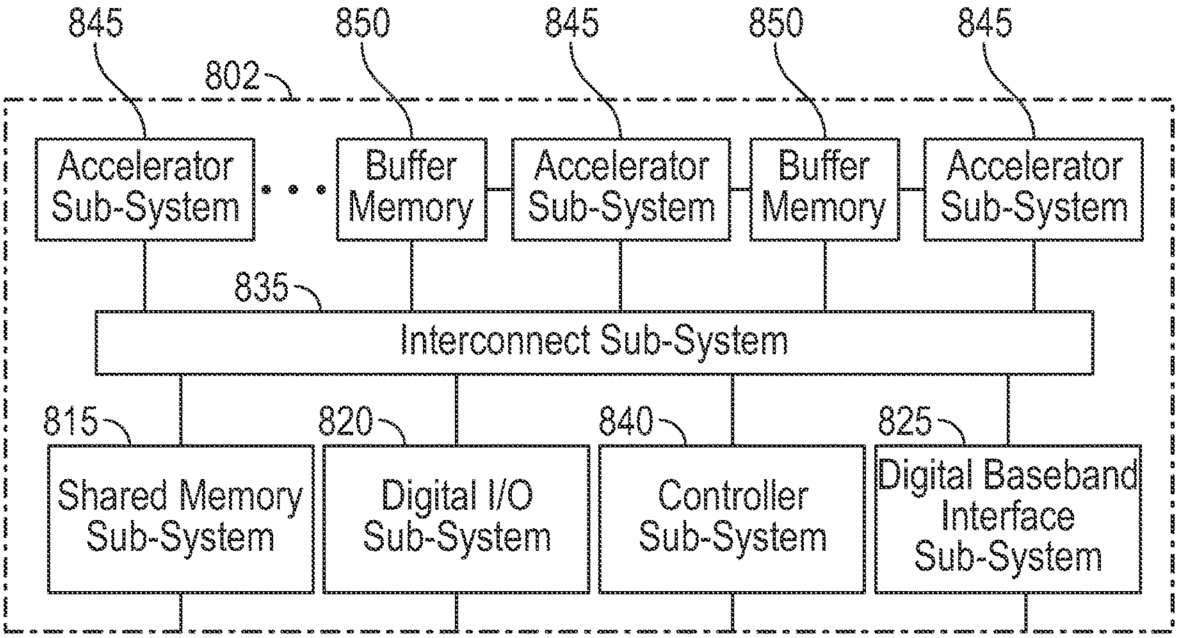
FIG. 8B illustrates an alternate aspect of an exemplary baseband processing subsystem, according to some aspects.

FIG. 8A illustrates a digital baseband processing subsystem 801, according to some aspects. FIG. 8B illustrates an alternate aspect of a digital baseband processing subsystem 802, according to some aspects.

In an aspect of FIG. 8A, the digital baseband processing subsystem 801 may include one or more of each of digital signal processor (DSP) subsystems 805A, 805B, . . . 805N, interconnect subsystem 835, boot loader subsystem 810, shared memory subsystem 815, digital I/O subsystem 820, and digital baseband interface subsystem 825.

In an aspect of FIG. 8B, digital baseband processing subsystem 802 may include one or more of each of accelerator subsystem 845A, 845B, . . . 845N, buffer memory 850A, 850B, . . . 850N, interconnect subsystem 835, shared memory subsystem 815, digital I/O subsystem 820, controller subsystem 840 and digital baseband interface subsystem 825.

In an aspect, boot loader subsystem 810 may include digital logic circuitry configured to perform configuration of the program memory and running state associated with each of the one or more DSP subsystems 805. Configuration of the program memory of each of the one or more DSP subsystems 805 may include loading executable program code from storage external to digital baseband processing subsystems 801 and 802. Configuration of the running state associated with each of the one or more DSP subsystems 805 may include one or more of the steps of: setting the state of at least one DSP core which may be incorporated into each of the one or more DSP subsystems 805 to a state in which it is not running, and setting the state of at least one DSP core which may be incorporated into each of the one or more DSP subsystems 805 into a state in which it begins executing program code starting from a predefined memory location.

In an aspect, shared memory subsystem 815 may include one or more of read-only memory (ROM), static random access memory (SRAM), embedded dynamic random access memory (eDRAM) and/or non-volatile random access memory (NVRAM).

In an aspect, digital I/O subsystem 820 may include one or more of serial interfaces such as Inter-Integrated Circuit (I2C), Serial Peripheral Interface (SPI) or other 1, 2 or 3-wire serial interfaces, parallel interfaces such as general-purpose input-output (GPIO), register access interfaces and direct memory access (DMA). In an aspect, a register access interface implemented in digital I/O subsystem 820 may permit a microprocessor core external to digital baseband processing subsystem 801 to read and/or write one or more of control and data registers and memory. In an aspect, DMA logic circuitry implemented in digital I/O subsystem 820 may permit transfer of contiguous blocks of data between memory locations including memory locations internal and external to digital baseband processing subsystem 801.

In an aspect, digital baseband interface subsystem 825 may provide for the transfer of digital baseband samples between baseband processing subsystem and mixed signal baseband or radio-frequency circuitry external to digital baseband processing subsystem 801. In an aspect, digital baseband samples transferred by digital baseband interface subsystem 825 may include in-phase and quadrature (I/Q) samples.

In an aspect, controller subsystem 840 may include one or more of each of control and status registers and control state machines. In an aspect, control and status registers may be accessed via a register interface and may provide for one or more of: starting and stopping operation of control state machines, resetting control state machines to a default state, configuring optional processing features, and/or configuring the generation of interrupts and reporting the status of operations. In an aspect, each of the one or more control state machines may control the sequence of operation of each of the one or more accelerator subsystems 845. There may be examples of implementations of both FIG. 8A and FIG. 8B in the same baseband subsystem.

Figure 9:
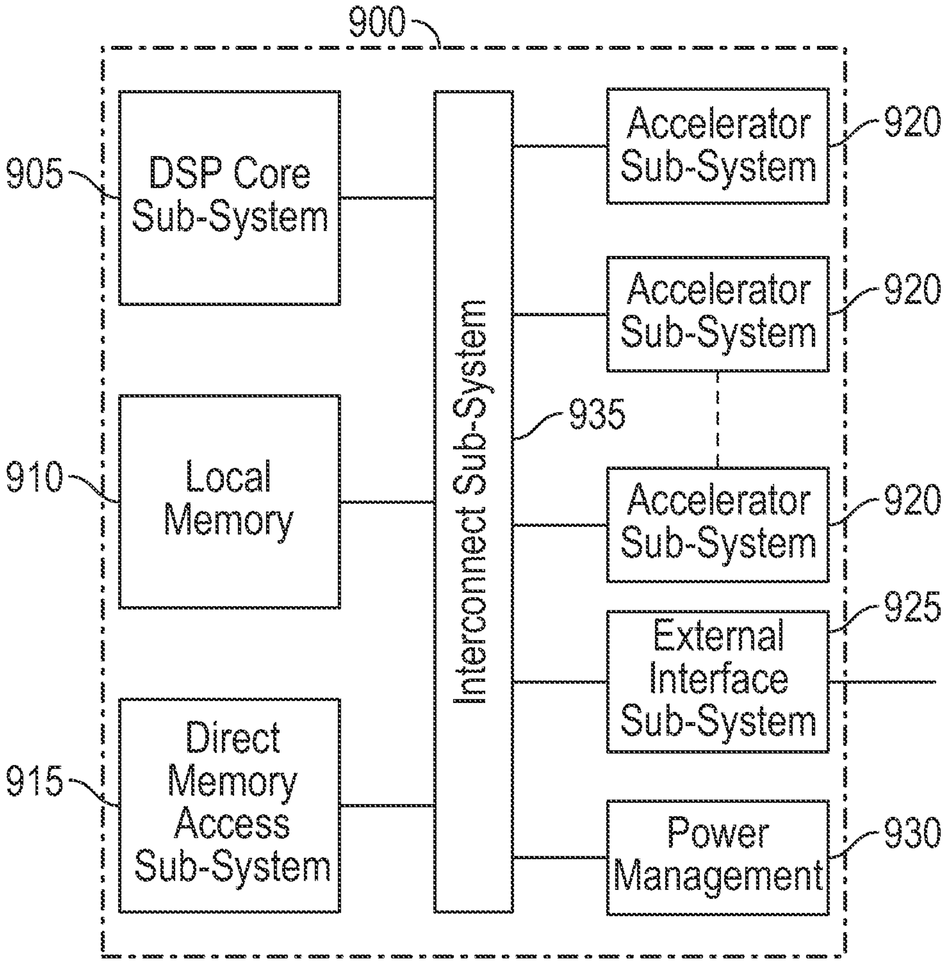
FIG. 9 illustrates an exemplary digital signal processor subsystem, according to some aspects.

FIG. 9 illustrates a digital signal processor (DSP) subsystem 900 according to some aspects. In an aspect, DSP subsystem 900 may include one or more of each of DSP core subsystem 905, local memory 910, direct memory access (DMA) subsystem 915, accelerator subsystem 920A, 920B . . . 920N, external interface subsystem 925, power management circuitry 930 and interconnect subsystem 935.

In an aspect, the local memory 910 may include one or more of each of read-only memory, static random access memory or embedded dynamic random access memory.

In an aspect, the DMA subsystem 915 may provide registers and control state machine circuitry adapted to transfer blocks of data between memory locations including memory locations internal and external to DSP subsystem 900.

In an aspect, external interface subsystem 925 may provide for access by a microprocessor system external to DSP subsystem 900 to one or more of memory, control registers and status registers which may be implemented in DSP subsystem 900. In an aspect, external interface subsystem 925 may provide for transfer of data between local memory 910 and storage external to DSP subsystem 900 under the control of one or more of the DMA subsystem 915 and the DSP core subsystem 905.

Configurable Hybrid Beam forming

As described earlier herein, different applications require digital beamforming for some chains and analog beamforming for others. However, most hardware implementations available today are fixed for either digital or analog beamforming and do not allow flexibility based on application or use case.

Systems described herein address these and other concerns by providing a configurable solution for analog or digital beamforming that enables dynamic selection of which chains are combined in analog domain (analog beamforming) versus in the digital domain (digital beamforming). This dynamic selection can be based on use case, conditions (line of sight (LOS) or non-line of sight (NLOS), signal-to-noise ratio (SNR), etc.), and can also enable wider bandwidth carrier aggregation by transmitting and receiving on different carriers at different frequencies on different beams.

Systems according to some aspects can use a segmented mixer design with different weighted slices that can be connected to intermediate frequency (IF) chains of different Trans-Impedance Amplifiers (TIAs). Configuration of which weighted slices are enabled can configure which of one or more paths are active and therefore activate or configure analog or digital beamforming.

A configurable solution to select between analog or digital beamforming in a dynamic manner allows the choice to be made based on application or use case. Digital beamforming requires implementing the entire RF chain (including data converters) for every antenna element in the array. For analog beamforming, the signal is split when the signal is being transmitted (or combined when the signal is being received) close to the antenna elements so only a small portion of the RF chain is repeated for each antenna element. Accordingly, it can be understood that digital beamforming implementations consume much more power than analog beamforming implementations, due to the use of more circuit components in particular data converters. On the other hand, digital beamforming does provide for implementing many beams simultaneously, in contrast to analog beamforming.

Some use cases require multiple beams, and other use cases can be implemented more advantageously with multiple beams. For example, systems or cases using multi-user MIMO (or communication with a large number of user equipments (UEs), multi-path environments (where a single line of sight beam is not practical), carrier aggregation, or multi base station communication (for example in performing handovers) may be only implemented, or best implemented, with multiple beams and digital beamforming. For other use cases where only one or two beams are needed, then analog beamforming may be sufficient and would enable noticeable power consumption improvements.

Figure 10:
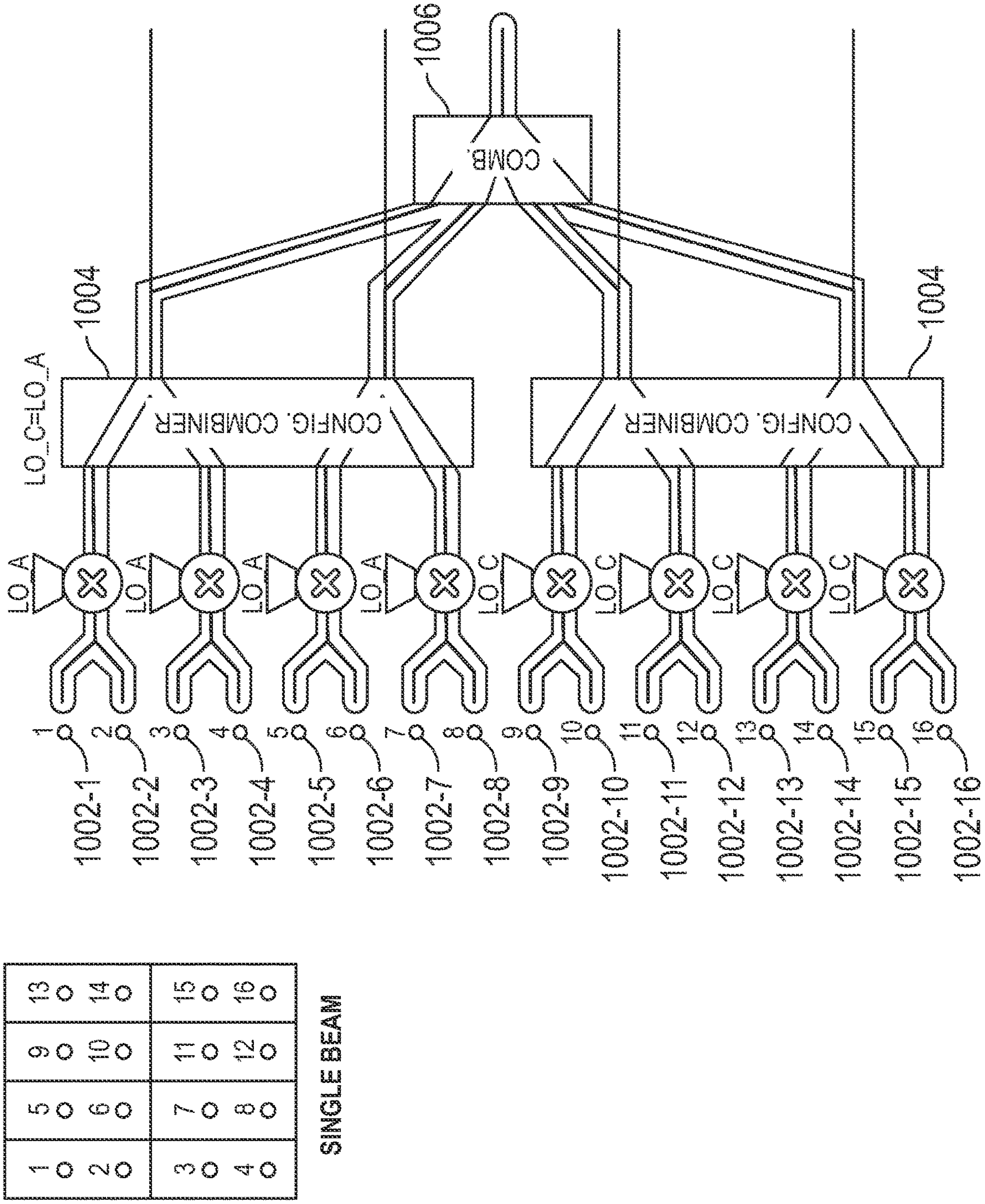
FIG. 10 illustrates a configurable beamforming for a multi-element antenna array implementing analog beamforming according to some aspects.
Figure 11:
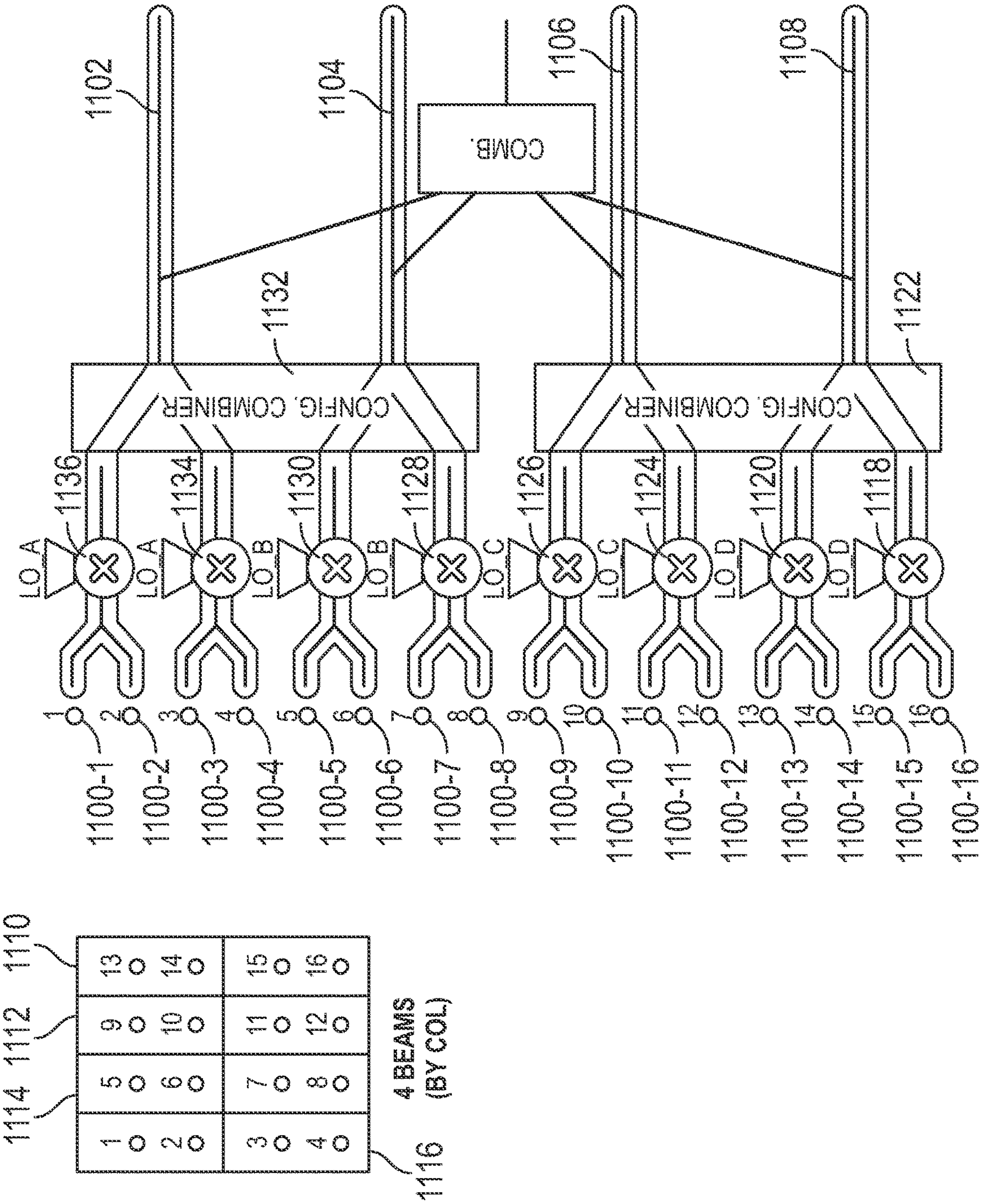
FIG. 11 illustrates hybrid beamforming using digital beamforming by column for a sixteen-element array according to some aspects.

FIG. 10 illustrates one implementation of analog beamforming for a multi-element antenna array according to some aspects. While sixteen elements are shown, it will be understood that aspects are not limited thereto. In the example, all sixteen elements 1002-1 through 1002-16 are combined for reception (or split for transmission in the analog domain to a signal chain that would interface to a single IF converter and/or data converter chain. While two antenna elements are shown for each mixer 1003-1, 1003-2, 1003-3, 1003-4, 1003-5, 1003-6, 1003-7, 1003-8, it will be appreciated that each antenna element can instead have its own mixer. A combiner (not shown in FIG. 10) may be in front of each mixer 1003-1, 1003-2, 1003-3, 100304, 1003-5, 1003-6, 1003-7, 1003-8 to combine for example 1002-1 with 1002-2, etc. The combiners 1004 can generate other combined signals or route every antenna element signal into its own path, or some combination thereof. In FIG. 10, the combiners 1004 closest to the antennas 1002-1 through 1002-16 are configurable, which enables the signals to be combined in the analog domain at 1006 or routed to dedicated chains for use in digital beamforming. In some examples, the combiner 1004 can comprise a full bypass sending all four mixer signals to four dedicated chains to implement full digital beamforming (i.e., the FIG. 11 illustrates hybrid beamforming using digital beamforming by column for a sixteen-element array according to some aspects. The same hardware is shown as in FIG. 10 configured for analog beamforming, but with separate dedicated paths 1102, 1104, 1106, 1108 to the IF converter and/or data converter chains. This example shows how analog beamforming with analog combining is implemented vertically and digital combining is implemented horizontally (i.e., analog combining for each element in a column in the analog domain, and a separate path 1102, 1104, 1106, 1108 per column to activate digital beamforming). For example, antenna elements 1100-13, 1100-14, 1100-15 and 1100-16, which are from a same column 1110 are combined in the analog domain by mixers 1118, 1120 and then into one path (and one beam) 1108 by combiner 1122. Similarly, antenna elements 1100-9, 1100-10, 1100-11, and 1100-12, which are from a same column 1112, are combined in the analog domain by mixers 1124, 1126 and then into another path (and one beam) 1106 by combiner 1122. Similarly, antenna elements 1100-8, 1100-7, 1100-6, and 1100-5, which are from a same column 1114, are combined in the analog domain by mixers 1128, 1130 and into a path (and one beam) 1104 by combiner 1132. Similarly, antenna elements 1100-4, 1100-3, 1100-2, and 1100-1, which are from a same column 1116, are combined in the analog domain by mixers 1134, 1136 and then into another path (and one beam) 1102 by the combiner 1132.

While the example of FIG. 11 shows a hybrid approach with analog combining of four elements (i.e., four paths/beams 1102, 1104, 1106, 1108 to IF/data converters), aspects can be configured for analog combining of eight elements (i.e., two paths to IF/data converters), or even analog combining of two elements (i.e., eight paths to IF/data converters). In some aspects, each antenna element 1002-1 through 1002-16 can go to a separate mixer, and separate or shared oscillators. In any case, the dynamic configuration of analog beamforming, digital beamforming, or a hybrid of both analog and digital beamforming can be performed in baseband circuitry or beamforming circuitry of a base station, gNB, etc.

For example, the configurable combining shown in FIG. 11 could be implemented utilizing a segmented mixer design with different weighted slices that are connected to IF chains of different TIAs. Configuration of which weighted slices are to be enabled can enable the selection of one or more paths being active and therefore activate or configure dynamically configurable analog or digital beamforming.

Figure 12A:
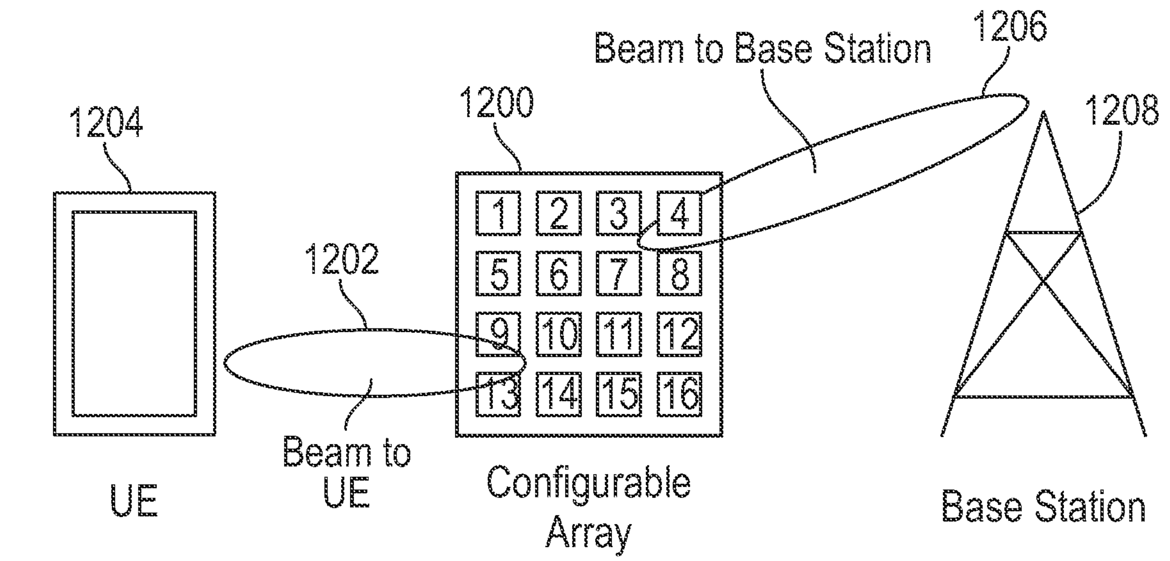
FIG. 12A illustrates a first example of configurable beamforming according to some aspects.

In examples of device-to-device (D2D) communication, digital beamforming enables separate beams for communicating from UE to UE, and therefore baseband controllers at each of the UEs involved in D2D communication can configure digital beamforming or analog beamforming depending on the communication being performed. For example, a UE can use analog beamforming with a single beam when communicating only with the base station. On the other hand, the UE can use digital beamforming with two or more beams when the UE is communicating with the base station and a UE (or multiple UE's). In other words, the UE may use one beam per device being communicated with, to allow simultaneous communication. FIG. 12A illustrates example UE digital beamforming according to some aspects. A UE can have a 16-element configurable antenna array 1200. Baseband circuitry of the UE can perform digital beamforming with beam 1202 being configured for communication with another UE 1204. Beamforming can be performed with beam 1206 to communicate simultaneously with a base station 1208.

Figure 12B:
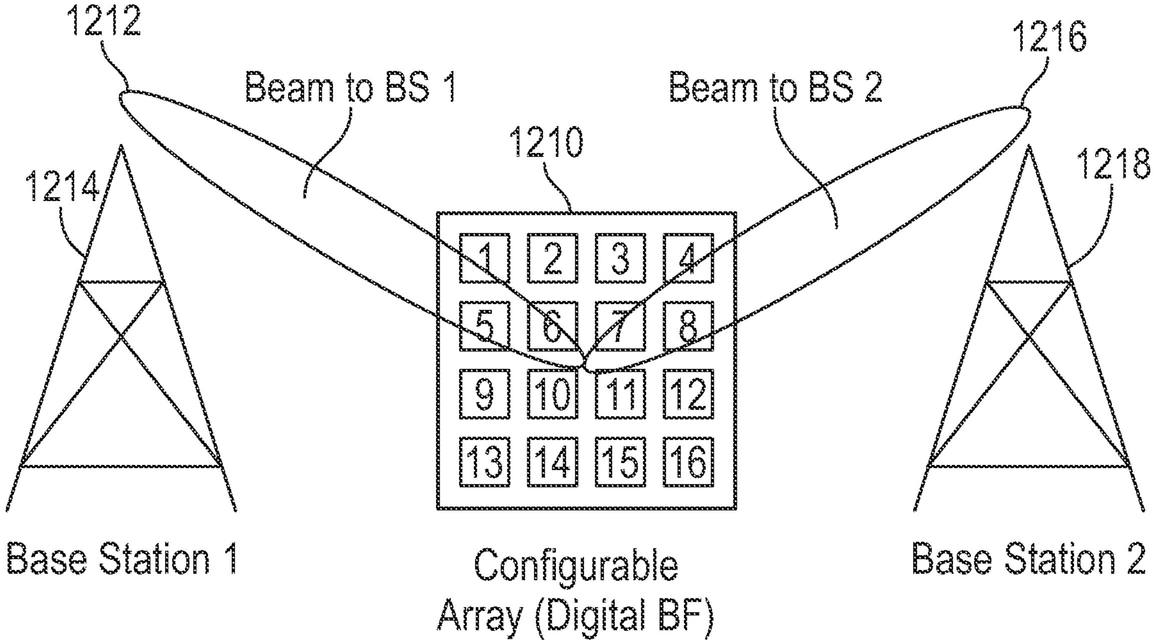
FIG. 12B illustrates a second example of configurable beamforming according to some aspects.

Base stations can incorporate a similar concept, in that baseband controllers at a gNB can configure digital beamforming or analog beamforming depending on the communication being performed. For example, a gNB can use analog beamforming with a single beam when communicating only with a single UE. On the other hand, the gNB can use digital beamforming with two or more beams when communicating to a UE and a gNB (or multiple gNBs) at the same time. FIG. 12B illustrates example gNB digital beamforming according to some aspects. A gNB can have a 16-element configurable antenna array 1210.

Baseband circuitry of the gNB can perform digital beamforming with beam 1212 being configured for communication with another base station 1214. Another beam 1216 can be configured for simultaneous communication with yet another base station 1218.

In examples using multi-user communication, a gNB, base station, etc., can switch to digital beamforming when many users are present, and many beams are needed to communicate with many users. When the number of users falls below a threshold, then analog beamforming can be activated to save power consumption as only a few beams are required.

In examples in which diversity or performance improvements are needed, for example, in scenarios with a high multi-path environment, digital beamforming can be activated or configured for the base station or UE. The signal from the multiple paths/multiple beams, can be combined for signal to noise improvements, which can increase the effective cell radius for a given modulation coding scheme (MCS). Digital beamforming can also be configured to take advantage of multipath to increase data rate with additional MIMO layers, in other words each beam can be a different MIMO layer. When a low multi-path environment is detected or lower data rates are acceptable, then analog beamforming can be activated to save power with fewer number of MIMO layers (e.g., 1 MIMO layer for H polarization and 1 MIMO layer for V polarization).

If interference is detected and/or avoidance mechanisms are needed to avoid interference, digital beamforming can be activated or configured periodically to look for other beam directions/paths that have better signal to interference or signal to noise performance. Once the best beam direction is identified, the gNB, UE, etc., can switch back to analog beamforming for lower power consumption. In handover situations, digital beamforming can be activated or configured periodically to look for other base stations from other beam directions that have better performance (signal to noise or signal to interference). In this way, handovers can be assisted and therefore performed more quickly and smoothly. Once a better base station beam or signal is identified, traffic can be handed over to that base station and then the UE can switch back to analog beamforming for lower power for normal data communication.

Figure 13:
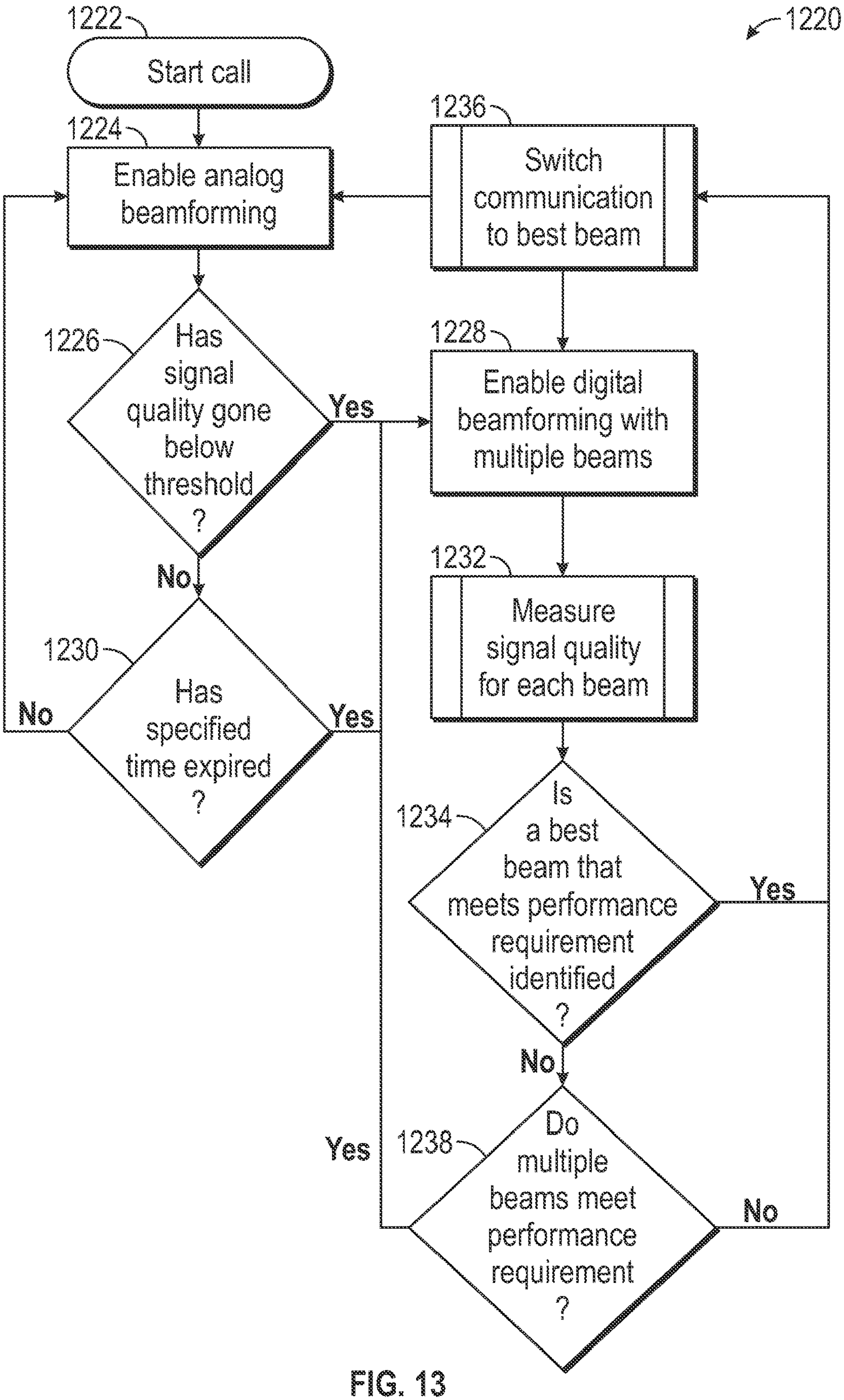
FIG. 13 is a flowchart of a method for choosing between digital and analog beamforming according to some aspects.

FIG. 13 is a flowchart of a method 1220 for choosing between digital and analog beamforming according to some aspects. The method 1220 can be implemented in controller circuitry, e.g., elements of a RFEM 115 or baseband subsystem 110 (FIG. 1) in any wireless communication device (e.g., UE, base station, gNB, etc.) or in local circuitry such as a beamforming IC 1400 (FIG. 14).

The method starts at operation 1222 with initiation of a transmission or other communication scenario by a wireless communication device. In operation 1224, the wireless communication device can default to analog beamforming for all antenna elements by, e.g., enabling analog beamforming. In operation 1226, the wireless communication device can determine that signal quality has deteriorated below a threshold. In operation 1228, responsive to determining that signal quality has deteriorated below a threshold, digital beamforming can be configured, activated, enabled, or turned on and analog beamforming can be disabled, de-configured, deactivated or turned off for at least some antenna elements. Otherwise, at operation 1230, the wireless communication device can determine whether a specified time period has expired. In some aspects, the time period can be a few seconds for applications with dynamic temperature or other environmental conditions. In other aspects, the time period can be many minutes or hours for applications with more static environmental conditions. If yes, in operation 1228, digital beamforming can be configured for at least some antenna elements. At operation 1232, the wireless communication device can detect signal quality for each beam. At operation 1234, if there is one beam found that by itself meets performance requirements, then the wireless communication device will switch to communication on that beam in operation 1236.

Otherwise, if the wireless communication device determines in operation 1238 that multiple beams meet the performance requirement, the wireless communication device will select the best continue with digital beamforming with multiple beams in operation 1228. In some aspects, information regarding next-best beam/s can be stored or saved in case the wireless communication device determines to switch to a next-best beam, for example if the best beam was later determined to no longer meet performance needs. If no best beam is found, and the use of multiple beams does not meet performance requirements, the communication device can select the best of available beams in operation 1236 and continue with analog beamforming in operation 1224. In other words, if there is no best beam found, and the use of multiple beams does not meet needs of the use case, communications may continue with analog beamforming.

Figure 14:
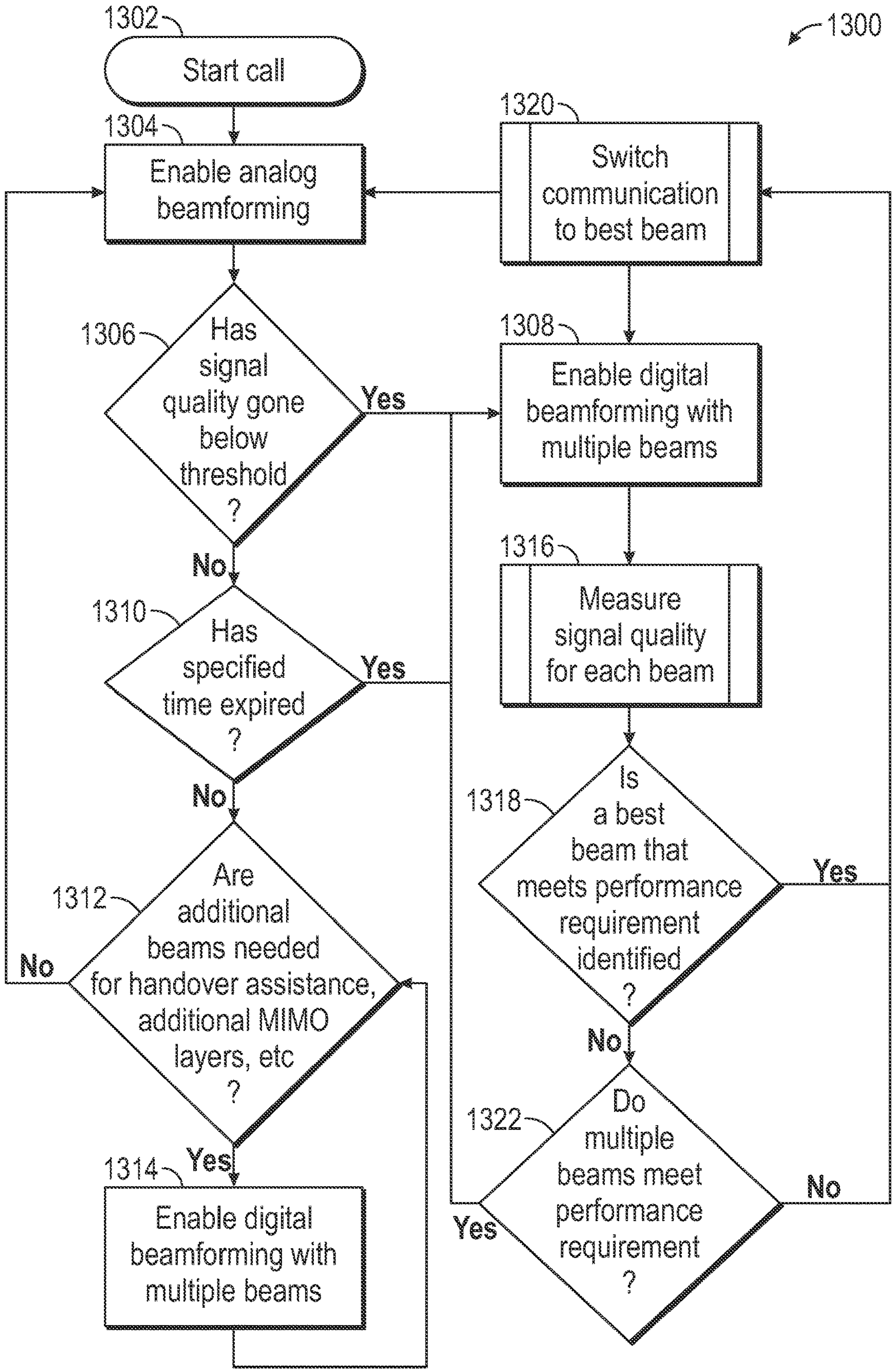
FIG. 14 is a flowchart of a method for selecting additional beams for some use cases according to some aspects.
Figure 15:
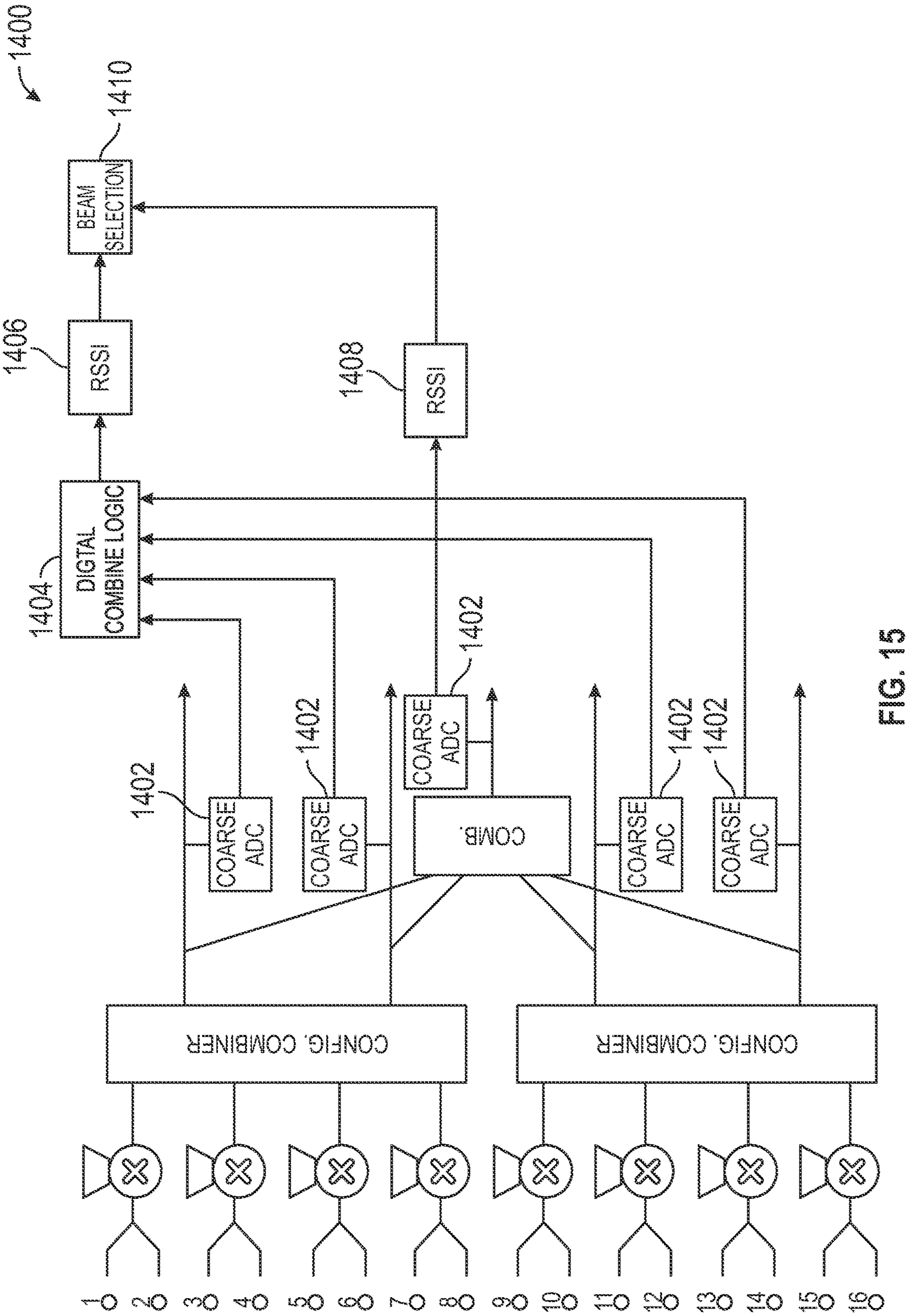
FIG. 15 illustrates a beamformer IC block diagram according to some aspects.

FIG. 14 is a flowchart of a method 1300 for selecting additional beams for some use cases according to some aspects. The method 1300 can be implemented in any wireless communication device (e.g., UE, base station, gNB, etc.), and in particular in controller elements such as, e.g., elements of a RFEM 115 or baseband sub-system 110 (FIG. 1) or in local circuitry such as a beamforming IC 1400 (FIG. 15)

The method starts at operation 1302 with initiation of a transmission or other communication scenario by a wireless communication device. In operation 1304, the wireless communication device can default to analog beamforming for all antenna elements. In operation 1306, the wireless communication device can determine that signal quality has deteriorated below a threshold. If yes, in operation 1308, digital beamforming can be configured for at least some antenna elements. Otherwise, at operation 1310, the wireless communication device can determine whether a specified time period has expired. If yes, in operation 1308, digital beamforming can be configured for at least some antenna elements.

If signal quality has not fallen below a threshold, and no specific time period has expired, in operation 1312 the wireless communication device can determine whether additional beams are needed for handover assistance, additional MIMO layers, etc. If additional beams are needed, in operation 1314, digital beamforming with multiple beams can be activated or configured. The wireless communication device will continue with digital beamforming on multiple beams until determining that additional beams are no longer needed, at which point the wireless communication device will re-activate analog beamforming in operation 1304.

If the wireless communication device switched to digital beamforming due to poor signal quality (operation 1306) or due to expiration of a time period (operation 1310), the wireless communication device can detect signal quality for each beam at operation 1316. At operation 1318, if there is one beam found that by itself meets performance requirements, then the wireless communication device will switch to communication on that beam in operation 1320.

Otherwise, if the wireless communication device determines in operation 1322 that using multiple beams meets the performance requirement (e.g., a requirement of the use cases described above, or signal strength or other requirements), the wireless communication device will select the best continue with digital beamforming with multiple beams in operation 1308. If no best beam is found, and the use of multiple beams does not meet or help the communication device to meet performance requirements, the communication device may select the best of available beams in operation 1320 and continue with analog beamforming in operation 1304.

FIG. 15 illustrates a beamformer IC 1400 block diagram according to some aspects. FIG. 15 illustrates additional blocks to measure RSSI in both analog and digital beamforming modes.

In either method 1200 or method 1300, or in any other aspects that can select between digital and analog beamforming, a selection algorithm can perform signal measurements, e.g., radio signal strength indicator (RSSI) measurements on the beamforming IC 1400, which can be faster relative to relying on decisions of baseband circuitry. For example, the beamforming IC can take RSSI measurements by coarsely digitizing RF signals at block 1402. At block 1404, the digital data is combined so that the RSSI associated with digital or hybrid beamforming can be measured in 1406. Block 1404 is a configurable combiner for the RSSI path and can perform artificial intelligence (AI) algorithms to learn best beams and configurations for different use cases. 1406 to do the integration and return the RSSI and integrating this digitization at block 1404 to measure RF signal power at blocks 1406.

If analog beamforming is activated, RSSI measurement can be taken on the combined signal at block 1408. In at least these aspects, the beamforming IC 1400 can use time variations of the estimated signal power to estimate if the signal quality falls below a certain threshold (e.g., decision point 1206, 1306 (FIG. 13 or FIG. 14).

During beam scanning, the beamforming IC 1400 may estimate RSSI across a range of predefined beam directions by digitizing each path, applying proper beamforming weights, and integrating the combined signal. The beamforming IC 1400 or other circuitry can determine best beam(s) at block 1410 during this beam scanning procedure. Alternatively, instead of estimating RSSI for predefined beams, AI algorithms according to some aspects can change the weights applied in 1404 to the digitized version of each RF path, scan more directions to identify better beams, and extrapolate beam direction and nulling for subsequent communications. Extra beams can be formed to communicate extrapolated models for multipath and interference between users and a base station. Extra beams can also be formed for sounding the environment for reflection and channel modeling.

Using the above methodologies, antenna arrays can be dynamically configured to suit different use cases that are best implemented using digital beamforming, when high performance is needed, versus other use cases in which power savings are more important and which are better suited to analog beamforming.

Other Systems and Apparatuses

Figure 16:
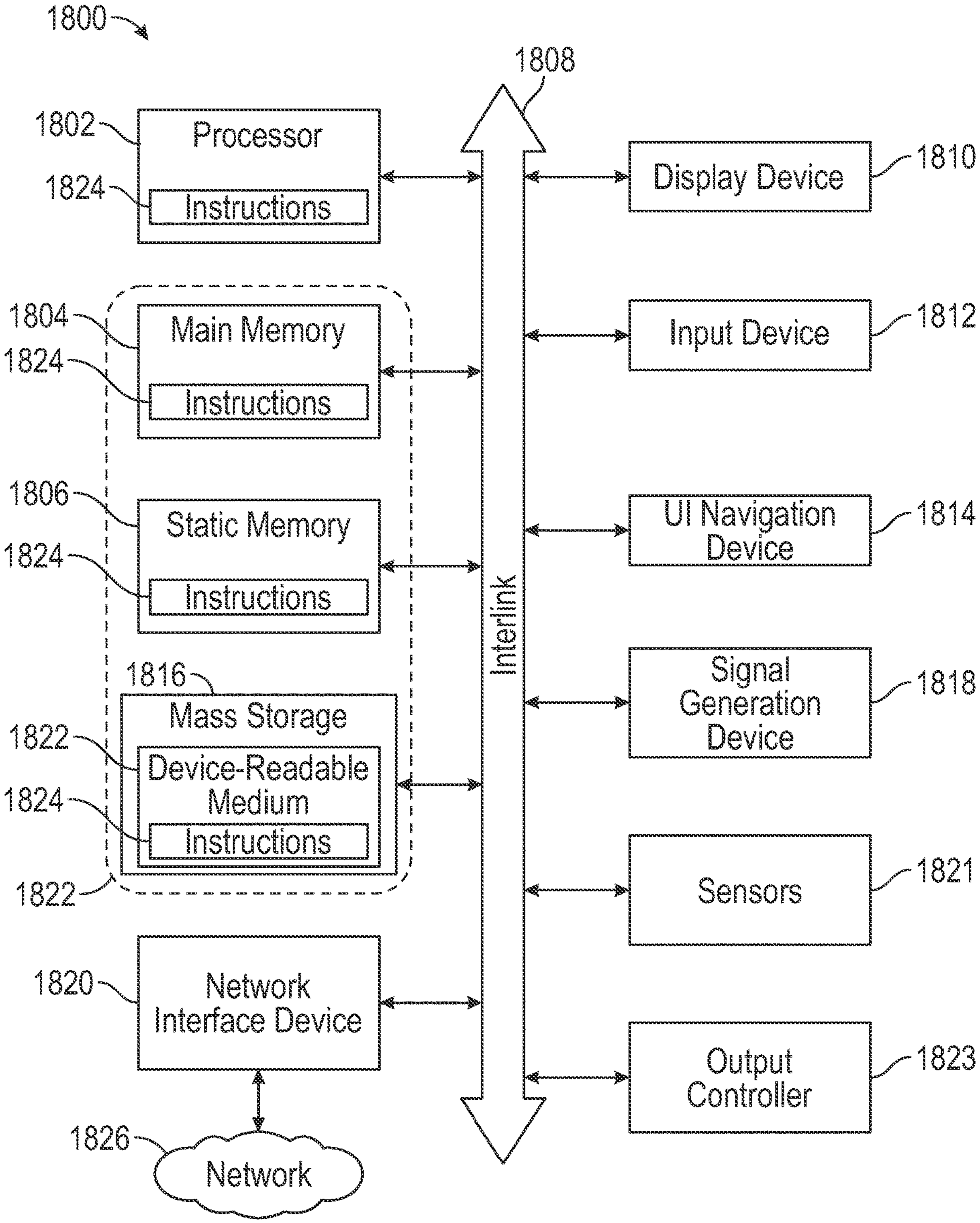
FIG. 16 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 16 illustrates a block diagram of a communication device 1800 such as an evolved Node-B (eNB), a new generation Node-B (gNB), an access point (AP), a wireless station (STA), a mobile station (MS), or a user equipment (UE), in accordance with some aspects. In alternative aspects, the communication device 1800 may operate as a standalone device or may be connected (e.g., networked) to other communication devices. In some aspects, the communication device 1800 can use one or more of the techniques and circuits discussed herein, in connection with any of FIG. 1-FIG. 15.

Circuitry (e.g., processing circuitry) is a collection of circuits implemented in tangible entities of the device 1800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1800 follow.

In some aspects, the device 1800 may operate as a standalone device or may be connected (e.g., networked) to other devices. In a networked deployment, the communication device 1800 may operate in the capacity of a server communication device, a client communication device, or both in server-client network environments. In an example, the communication device 1800 may act as a peer communication device in peer-to-peer (P2P) (or other distributed) network environment. The communication device 1800 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1800 may include a hardware processor 1802 (e.g., a central processing unit (CPU), a graphics processing unit (GPU), a hardware processor core, or any combination thereof), a main memory 1804, a static memory 1806, and mass storage device 1816 (e.g., hard drive, tape drive, flash storage, or other block or storage devices), some or all of which may communicate with each other via an interlink (e.g., bus) 1808.

The communication device 1800 may further include a display unit 1810, an alphanumeric input device 1812 (e.g., a keyboard), and a user interface (UI) navigation device 1814 (e.g., a mouse). In an example, the display unit 1810, input device 1812 and UI navigation device 1814 may be a touch screen display. The communication device 1800 may additionally include a signal generation device 1818 (e.g., a speaker), a network interface device 1820, and one or more sensors 1821, such as a global positioning system (GPS) sensor, compass, accelerometer, or other sensor. The communication device 1800 may include an output controller 1823, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The mass storage device 1816 may include a communication device-readable medium 1822, on which is stored one or more sets of data structures or instructions 1824 (e.g., software) embodying or utilized by any one or more of the techniques or functions described herein. In some aspects, registers of the processor 1802, the main memory 1804, the static memory 1806, and/or the mass storage device 1816 may be, or include (completely or at least partially), the device-readable medium 1822, on which is stored the one or more sets of data structures or instructions 1824, embodying or utilized by any one or more of the techniques or functions described herein. In an example, one or any combination of the hardware processor 1802, the main memory 1804, the static memory 1806, or the mass storage device 1816 may constitute the device-readable medium 1822.

As used herein, the term "device-readable medium" is interchangeable with "computer-readable medium" or "machine-readable medium". While the communication device-readable medium 1822 is illustrated as a single medium, the term "communication device-readable medium" may include a single medium or multiple media (e.g., a centralized or distributed database, and/or associated caches and servers) configured to store the one or more instructions 1824.

The term "communication device-readable medium" may include any medium that is capable of storing, encoding, or carrying instructions for execution by the communication device 1800 and that cause the communication device 1800 to perform any one or more of the techniques of the present disclosure, or that is capable of storing, encoding or carrying data structures used by or associated with such instructions. Non-limiting communication device-readable medium examples may include solid-state memories, and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks: Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 1824 may further be transmitted or received over a communications network 1826 using a transmission medium via the network interface device 1820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1820 may include one or more physical jacks (e.g., Ethernet, coaxial, or phone jacks) or one or more antennas to connect to the communications network 1826. In an example, the network interface device 1820 may include a plurality of antennas to wirelessly communicate using at least one of single-input multiple-output (SIMO), MIMO, or multiple-input single-output (MISO) techniques. In some examples, the network interface device 1820 may wirelessly communicate using Multiple User MIMO techniques.

The term "transmission medium" shall be taken to include any intangible medium that is capable of storing, encoding, or carrying instructions for execution by the communication device 1800, and includes digital or analog communications signals or other intangible medium to facilitate communication of such software. In this regard, a transmission medium in the context of this disclosure is a device-readable medium.

Figure 17:
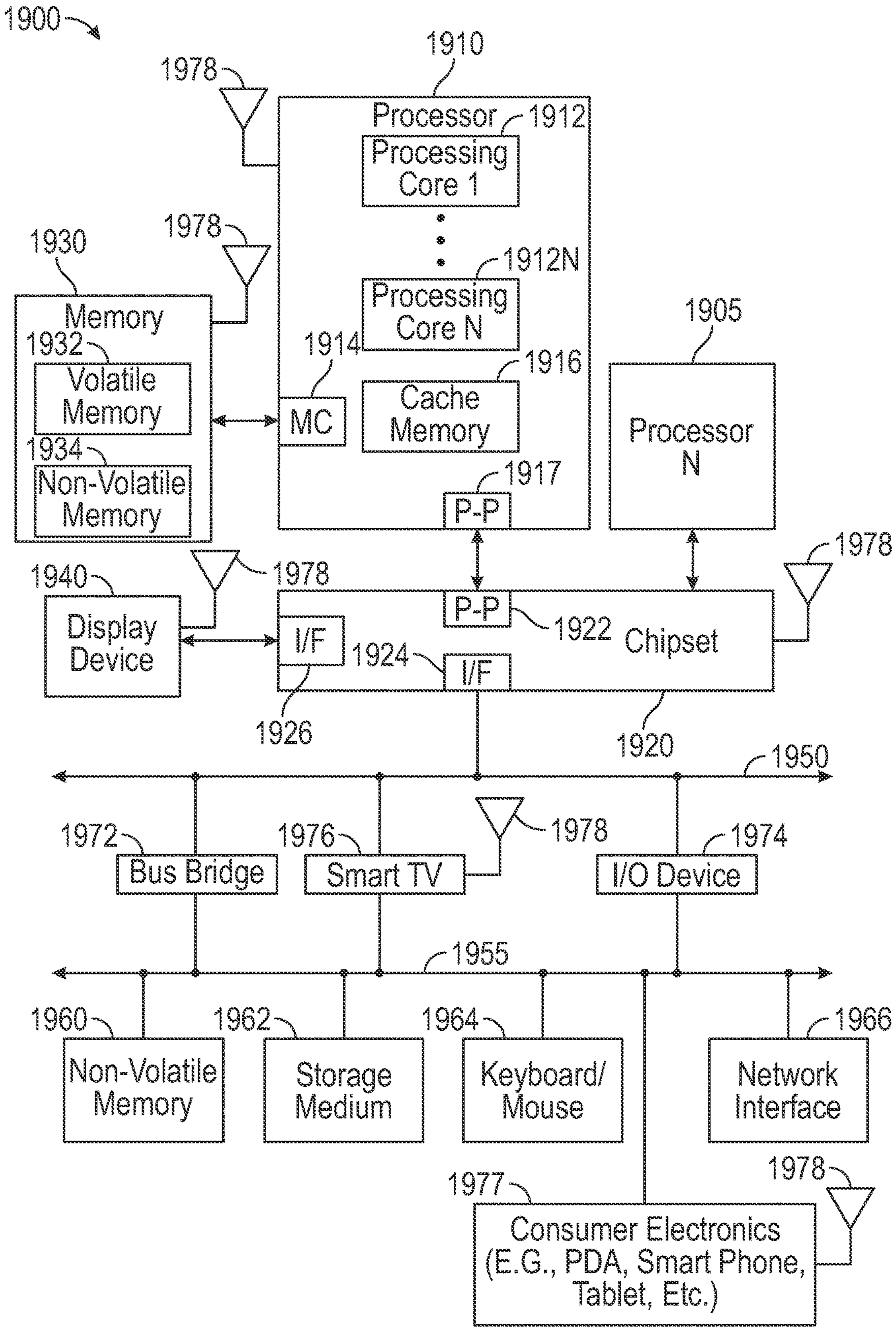
FIG. 17 illustrates a system level diagram, depicting an example of an electronic device (e.g., system) that can include, for example, a transmitter configured to selectively fan out a signal to one of multiple communication channels.

FIG. 17 illustrates a system level diagram, depicting an example of an electronic device (e.g., system) that can include, for example, a transmitter configured to selectively fan out a signal to one of multiple communication channels. FIG. 17 is included to show an example of a higher-level device application for the subject matter discussed above with regards to FIGS. 1-15. In one aspect, system 1900 includes, but is not limited to, a desktop computer, a laptop computer, a netbook, a tablet, a notebook computer, a personal digital assistant (PDA), a server, a workstation, a cellular telephone, a mobile computing device, a smart phone, an Internet appliance, or any other type of computing device. In some aspects, system 1900 is a system on a chip (SOC) system.

In one aspect, processor 1910 has one or more processor cores 1912, . . . , 1912N, where 1912N represents the Nth processor core inside processor 1910 where N is a positive integer. In one aspect, system 1900 includes multiple processors including 1910 and 1905, where processor 1905 has logic similar or identical to the logic of processor 1910. In some aspects, processing core 1912 includes, but is not limited to, pre-fetch logic to fetch instructions, decode logic to decode the instructions, execution logic to execute instructions and the like. In some aspects, processor 1910 has a cache memory 1916 to cache instructions and/or data for system 1900. Cache memory 1916 may be organized into a hierarchal structure including one or more levels of cache memory.

In some aspects, processor 1910 includes a memory controller 1914, which is operable to perform functions that enable the processor 1910 to access and communicate with memory 1930 that includes a volatile memory 1932 and/or a non-volatile memory 1934. In some aspects, processor 1910 is coupled with memory 1930 and chipset 1920. Processor 1910 may also be coupled to a wireless antenna 1978 to communicate with any device configured to transmit and/or receive wireless signals. In one aspect, an interface for wireless antenna 1978 operates in accordance with, but is not limited to, the IEEE 802.11 standard and its related family, Home Plug AV (HPAV), Ultra Wide Band (UWB), Bluetooth, WiMax, or any form of wireless communication protocol.

In some aspects, volatile memory 1932 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. Non-volatile memory 1934 includes, but is not limited to, flash memory, phase change memory (PCM), read-only memory (ROM), electrically erasable programmable read-only memory (EEPROM), or any other type of non-volatile memory device.

Memory 1930 stores information and instructions to be executed by processor 1910. In one aspect, memory 1930 may also store temporary variables or other intermediate information while processor 1910 is executing instructions. In the illustrated aspect, chipset 1920 connects with processor 1910 via Point-to-Point (PtP or P-P) interfaces 1917 and 1922. Chipset 1920 enables processor 1910 to connect to other elements in system 1900. In some aspects of the example system, interfaces 1917 and 1922 operate in accordance with a PtP communication protocol such as the Intel® QuickPath Interconnect (QPI) or the like. In other aspects, a different interconnect may be used.

In some aspects, chipset 1920 is operable to communicate with processor 1910, 1905N, display device 1940, and other devices, including a bus bridge 1972, a smart TV 1976, I/O devices 1974, nonvolatile memory 1960, a storage medium (such as one or more mass storage devices) 1962, a keyboard/mouse 1964, a network interface 1966, and various forms of consumer electronics 1977 (such as a PDA, smart phone, tablet etc.), etc. In one aspect, chipset 1920 couples with these devices through an interface 1924. Chipset 1920 may also be coupled to a wireless antenna 1978 to communicate with any device configured to transmit and/or receive wireless signals.

Chipset 1920 connects to display device 1940 via interface 1926. Display device 1940 may be, for example, a liquid crystal display (LCD), a plasma display, cathode ray tube (CRT) display, or any other form of visual display device. In some aspects of the example system, processor 1910 and chipset 1920 are merged into a single SOC. In addition, chipset 1920 connects to one or more buses 1950 and 1955 that interconnect various system elements, such as I/O devices 1974, nonvolatile memory 1960, storage medium 1962, a keyboard/mouse 1964, and network interface 1966. Buses 1950 and 1955 may be interconnected together via a bus bridge 1972.

In one aspect, storage medium 1962 includes, but is not limited to, a solid-state drive, a hard disk drive, a universal serial bus flash memory drive, or any other form of computer data storage medium. In one aspect, network interface 1966 is implemented by any type of well-known network interface standard including, but not limited to, an Ethernet interface, a universal serial bus (USB) interface, a Peripheral Component Interconnect (PCI) Express interface, a wireless interface and/or any other suitable type of interface. In one aspect, the wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 17 are depicted as separate blocks within the system 1900, the functions performed by some of these blocks may be integrated within a single semiconductor circuit or may be implemented using two or more separate integrated circuits. For example, although cache memory 1916 is depicted as a separate block within processor 1910, cache memory 1916 (or selected aspects of 1916) can be incorporated into processor core 1912.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "an example aspect", "some aspects", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a sensor device, an Internet of Things (IoT) device, a wearable device, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may, for example, be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016); IEEE 802.1 lay (P802.1 lay Standard for Information Technology—Telecommunications and Information Exchange Between Systems Local and Metropolitan Area Networks—Specific Requirements Part 11. Wireless LAN Medium Access Control (MAC) and Physical Layer (PHY) Specifications—Amendment: Enhanced Throughput for Operation in License-Exempt Bands Above 45 GHz)) and/or future versions and/or derivatives thereof, devices and/or networks operating in accordance with existing WiFi Alliance (WFA) Peer-to-Peer (P2P) specifications (including WiFi P2P technical specification, version 1.5, Aug. 4, 2015) and/or future versions and/or derivatives thereof, devices and/or networks operating in accordance with existing Wireless-Gigabit-Alliance (WGA) specifications (including Wireless Gigabit Alliance, Inc WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting and/or the action of receiving. In one example, the phrase "communicating a signal" may refer to the action of transmitting the signal by a first device and may not necessarily include the action of receiving the signal by a second device. In another example, the phrase "communicating a signal" may refer to the action of receiving the signal by a first device and may not necessarily include the action of transmitting the signal by a second device.

Some demonstrative aspects may be used in conjunction with a wireless communication network communicating over a frequency band above 45 Gigahertz (GHz), e.g., 60 GHz. However, other aspects may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a frequency band above 45 GHz, a frequency band below 20 GHz, e.g., a Sub 1 GHz (SIG) band, a 2.4 GHz band, a 5 GHz band, a WLAN frequency band, a WPAN frequency band, a frequency band according to the WGA specification, and the like.

As used herein, the term "circuitry" may, for example, refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, circuitry may include logic, at least partially operable in hardware. In some aspects, the circuitry may be implemented as part of and/or in the form of a radio virtual machine (RVM), for example, as part of a Radio processor (RP) configured to execute code to configured one or more operations and/or functionalities of one or more radio components.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna" or "antenna array", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Additional Notes and Aspects

Example 1 is a wireless communication device, comprising: an antenna array; and processing circuitry coupled to the antenna array and configured to: segment antenna elements of an antenna array into a configurable plurality of groups of antenna elements; activate analog beamforming for at least one group of the plurality of groups of antenna elements; and subsequent to enabling analog beamforming, configure digital beamforming for the at least one group based on a criterion In Example 2, the subject matter of Example 1 can optionally include wherein the processing circuitry is further configured to configure the at least one group of antenna elements for digital beamforming responsive to detecting a low signal quality level.

In Example 3, the subject matter of Example 2 can optionally include wherein detecting the low signal quality level is based on a received signal strength indicator (RSSI) measurement.

In Example 4, the subject matter of Example 3 can optionally include wherein the RSSI measurement is based on a combined analog beamformed signal.

In Example 5, the subject matter of Example 3 can optionally include wherein RSSI is estimated during beam scanning across a plurality of beam directions.

In Example 6, the subject matter of any one of Examples 1-5 can optionally include wherein the processing circuitry is further configured to configure digital beamforming for the group responsive to detecting expiration of a time period.

In Example 7, the subject matter of any one of Examples 1-6 can optionally include wherein the processing circuitry is further configured to configure digital beamforming for the group responsive to detecting a need for additional beams for a device served by a first of the two groups.

In Example 8, the subject matter of Example 7 can optionally include wherein the need for additional beams is based on a handover assistance condition.

In Example 9, the subject matter of any one of Examples 1-8 can optionally include mixers, at least one of the mixers being of a segmented design, and wherein the processing circuitry is to configure weighted slices of segmented mixers to configure groups of antenna elements.

Example 10 is a method for communication in a wireless communication network, the method comprising: initiating communications using a multi-element antenna array with analog beamforming configured for each element in the multi-element antenna array; detecting that communications quality has deteriorated below a threshold; and responsive to the detecting, configuring at least two chains from the multi-element antenna array for digital beamforming.

In Example 11, the subject matter of Example 10 can optionally include wherein detecting the communications quality comprises detecting a received signal strength indicator (RSSI) measurement.

In Example 12, the subject matter of Example 11 can optionally include wherein the RSSI measurement is made on a combined analog beamformed signal.

In Example 13, the subject matter of Example 11 can optionally include wherein the RSSI measurement is estimated during beam scanning across a plurality of beam directions.

In Example 14, the subject matter of any one of Examples 10-13 can optionally include measuring signal quality for different beams to identify a best beam.

In Example 15, the subject matter of any one of Examples 10-14 can optionally include detecting that a tinier has expired and, responsive to detecting that the timer has expired, configuring at least two chains from the multi-element antenna array for digital beamforming.

In Example 16, the subject matter ofany one of Examples 10-15 can optionally include detecting that a handover condition is present and, responsive to detecting the handover condition, configuring at least two chains from the multi-element antenna array for digital beamforming.

Example 17 is a non-transitory computer-readable medium including instructions that, when implemented on processing circuitry, cause the processing circuitry to perform operations including: initiating communications using a multi-element antenna array with analog beamforming configured for each element in the multi-element antenna array, detecting that communications quality has deteriorated below a threshold; and responsive to the detecting, configuring at least two chains from the multi-element antenna array for digital beamforming.

In Example 18, the subject matter of Example 17 can optionally include wherein detecting the communications quality comprises detecting a received signal strength indicator (RSSI) measurement.

In Example 19, the subject matter of Example 18 can optionally include wherein the RSSI measurement is made on a combined analog beamformed signal.

In Example 20, the subject matter of Example 18 can optionally include wherein the RSSI measurement is estimated during beam scanning across a plurality of beam directions.

In Example 21, the subject matter of any one of Examples 17-20 can optionally include detecting that a handover condition is present and, responsive to detecting the handover condition, configuring at least two paths from the multi-element antenna array for digital beamforming.

Example 22 is a system comprising means for performing any of Examples 1-21

The above detailed description includes references to the accompanying drawings, which form a part of the detailed description. The drawings show, by way of illustration, specific aspects in which the invention can be practiced. These aspects are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other aspects can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description, with each claim standing on its own as a separate aspect, and it is contemplated that such aspects can be combined with each other in various combinations or permutations. The scope of the invention should be determined with reference to the appended claims, along with the full scope of equivalents to which such claims are legally entitled.

What is claimed is:

1. A wireless communication device comprising:

an antenna array formed by antenna elements; and processing circuitry coupled to the antenna array and configured to:

separate antenna elements of an antenna array into a configurable plurality of groups of antenna elements associated with signal transmission or signal reception via a wireless channel, at least one group of the configurable plurality of groups comprising non-contiguous antenna elements;

activate analog beamforming for at least one group of the plurality of groups of antenna elements, the analog beamforming performed in a first direction by antenna elements in different rows of the antenna array;

subsequent to activating the analog beamforming, configure digital beamforming for the at least one group based on a group-specific criterion associated with the at least one group, the digital beamforming performed in a second direction by antenna elements in different columns of the antenna array, the first and second directions being orthogonal; and adaptively adjust a size of the at least one group of the plurality of groups of antenna elements in real time, based on channel conditions of the wireless channel.

2. The wireless communication device of claim 1, wherein the processing circuitry is further configured to configure the at least one group of antenna elements for digital beamforming responsive to detecting a low signal quality level.

3. The wireless communication device of claim 2, wherein detecting the low signal quality level is based on a received signal strength indicator (RSSI) measurement.

4. The wireless communication device of claim 3, wherein the RSSI measurement is based on a combined analog beamformed signal.

5. The wireless communication device of claim 3, wherein RSSI is estimated during beam scanning across a plurality of beam directions.

6. The wireless communication device of claim 1, wherein the processing circuitry is further configured to configure digital beamforming for the at least one group of antenna elements responsive to detecting an expiration of a time period.

7. The wireless communication device of claim 1, wherein the processing circuitry is further configured to configure digital beamforming for the at least one group of antenna elements responsive to detecting a need for additional beams for a device served by the at least one group of antenna elements.

8. The wireless communication device of claim 7, wherein the need for additional beams is based on a handover assistance condition.

9. The wireless communication device of claim 1, further comprising mixers, at least one of the mixers being of a segmented design, and wherein the processing circuitry is to configure weighted slices of segmented mixers to configure groups of antenna elements.

10. A method for communication in a wireless communication network, the method comprising:

initiating communications using a multi-element antenna array with analog beamforming configured for each element in the multi-element antenna array, the analog beamforming performed in a first direction by elements in different rows of the multi-element antenna array;

separating antenna elements of the multi-element antenna array into a configurable plurality of groups of antenna elements associated with signal transmission or signal reception via a wireless channel, at least one group comprising a non-contiguous set of antenna elements;

detecting that communications quality has deteriorated below a threshold;

responsive to the detecting, for at least one group, configuring digital beamforming based on a group-specific criterion associated with the at least one group, the digital beamforming performed in a second direction by elements in different columns of the multi-element antenna array, the first and second directions being orthogonal; and adaptively adjusting a size of the at least one group of the plurality of groups of antenna elements in real time, based on channel conditions of the wireless channel.

11. The method of claim 10, wherein detecting the communications quality comprises detecting a received signal strength indicator (RSSI) measurement.

12. The method of claim 11, wherein the RSSI measurement is made on a combined analog beamformed signal.

13. The method of claim 11, wherein the RSSI measurement is estimated during beam scanning across a plurality of beam directions.

14. The method of claim 10, further comprising measuring signal quality for different beams to identify a best beam.

15. The method of claim 10, further comprising detecting that a timer has expired and, responsive to detecting that the timer has expired, configuring at least two chains from the multi-element antenna array for digital beamforming.

16. The method of claim 10, further comprising detecting that a handover condition is present and, responsive to detecting the handover condition, configuring at least two chains from the multi-element antenna array for digital beamforming.

17. A non-transitory computer-readable medium including instructions that, when implemented on processing circuitry, cause the processing circuitry to perform operations including:

initiating communications using a multi-element antenna array with analog beamforming configured for each element in the multi-element antenna array, the analog beamforming performed in a first direction by elements in different rows of the multi-element antenna array;

separating antenna elements of the multi-element antenna array into a configurable plurality of groups of antenna elements associated with signal transmission or signal reception via a wireless channel, at least one group comprising a non-contiguous set of antenna elements;

detecting that communications quality has deteriorated below a threshold;

responsive to the detecting, for at least one group, configuring digital beamforming based on a group-specific criterion associated with the at least one group, the digital beamforming performed in a second direction by elements in different columns of the multi-element antenna array, the first and second directions being orthogonal; and adaptively adjusting a size of the at least one group of the plurality of groups of antenna elements in real time, based on channel conditions of the wireless channel.

18. The non-transitory computer-readable medium of claim 17, wherein detecting the communications quality comprises detecting a received signal strength indicator (RSSI) measurement.

19. The non-transitory computer-readable medium of claim 18, wherein the RSSI measurement is made on a combined analog beamformed signal.

20. The non-transitory computer-readable medium of claim 18, wherein the RSSI measurement is estimated during beam scanning across a plurality of beam directions.

21. The non-transitory computer-readable medium of claim 17, wherein the operations further comprise detecting that a handover condition is present and, responsive to detecting the handover condition, configuring at least two paths from the multi-element antenna array for digital beamforming.

* * * * *